US010846972B2

(12) United States Patent
Claghorn et al.

(10) Patent No.: US 10,846,972 B2
(45) Date of Patent: Nov. 24, 2020

(54) VENDING MACHINE

(71) Applicant: Royal Vendors, Inc., Kearneysville, WV (US)

(72) Inventors: Roger Claghorn, Kearneysville, WV (US); John Dundon, Kearneysville, WV (US); Ron Lovall, Kearneysville, WV (US); Kevin Ward, Kearneysville, WV (US); Steve Costello, Kearneysville, WV (US); Tom Unsicker, Kearneysville, WV (US)

(73) Assignee: ROYAL VENDORS, INC., Kearneysville, WV (US)

( * ) Notice: Subject to any disclaimer, the term of this patent is extended or adjusted under 35 U.S.C. 154(b) by 39 days.

(21) Appl. No.: 16/118,830

(22) Filed: Aug. 31, 2018

(65) Prior Publication Data

US 2020/0074783 A1    Mar. 5, 2020

(51) Int. Cl.
| G07F 11/00 | (2006.01) |
| G06Q 20/32 | (2012.01) |
| G07F 11/56 | (2006.01) |
| G06Q 20/18 | (2012.01) |

(52) U.S. Cl.
CPC .......... *G07F 11/005* (2013.01); *G06Q 20/18* (2013.01); *G06Q 20/3278* (2013.01); *G07F 11/007* (2013.01); *G07F 11/56* (2013.01)

(58) Field of Classification Search
None
See application file for complete search history.

(56) References Cited

U.S. PATENT DOCUMENTS

| 5,018,692 A * | 5/1991 | McGarrah | G07F 9/00 194/204 |
| 6,131,399 A * | 10/2000 | Hall | G06Q 10/087 221/150 R |
| 6,230,930 B1 * | 5/2001 | Sorensen | G07F 11/16 221/131 |
| 6,513,677 B1 * | 2/2003 | Sorensen | G07F 11/16 221/130 |
| 7,222,749 B2 | 5/2007 | Holdway et al. | |
| 8,534,494 B2 * | 9/2013 | Black, Jr. | G07F 9/026 221/126 |

(Continued)

*Primary Examiner* — Gene O Crawford
*Assistant Examiner* — Ayodeji T Ojofeitimi
(74) *Attorney, Agent, or Firm* — Westerman, Hattori, Daniels & Adrian, LLP

(57) ABSTRACT

A vending machine is disclosed which may include a level sensor to ensure proper positioning of the vending machine, and which can be used in an anti-theft alert scheme. The machine may also include an XY mechanism having an X-axis motor in a product area and a Y-axis motor in a transaction area. The machine may also include individually lockable doors between the product area and a delivery bin and between the delivery bin and the outside of the machine. The machine may also include quick release racks, trays and gates for easy removal and replacement. The machine may also include a controller which allows programming of product size or product price by rack or column. The machine may also include a refrigeration cassette which can be quickly removed and replaced. The machine may also include anti-theft legs or an anti-theft underside mechanism.

21 Claims, 29 Drawing Sheets

(56) References Cited

U.S. PATENT DOCUMENTS

| | | | |
|---|---|---|---|
| 2006/0011646 A1* | 1/2006 | Chirnomas | G07F 11/04 221/210 |
| 2007/0084876 A1* | 4/2007 | Ardern | G07F 11/16 221/258 |
| 2008/0135574 A1* | 6/2008 | Hieb | G07F 11/10 221/123 |
| 2015/0122688 A1* | 5/2015 | Dias | A47G 19/025 206/459.1 |

* cited by examiner

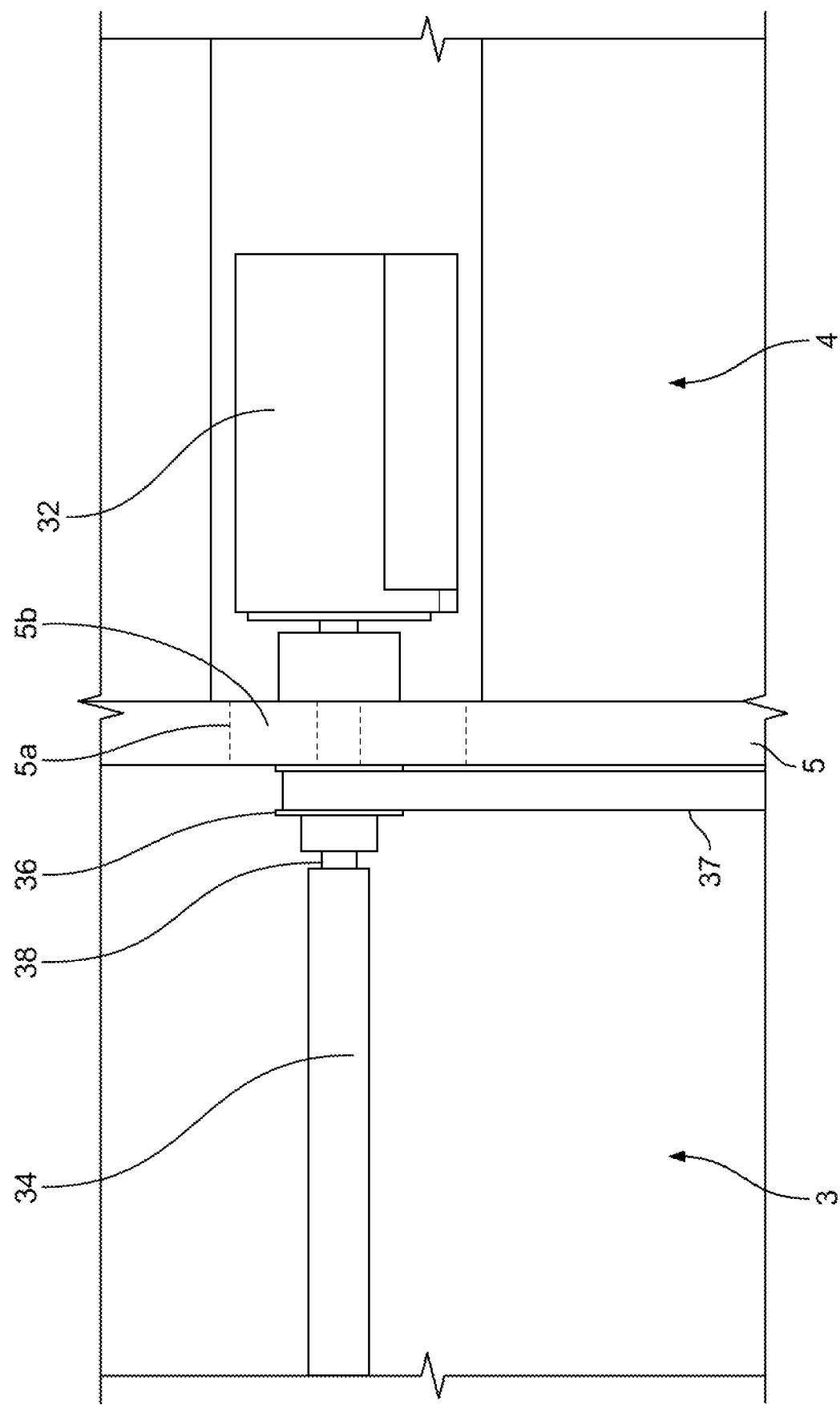

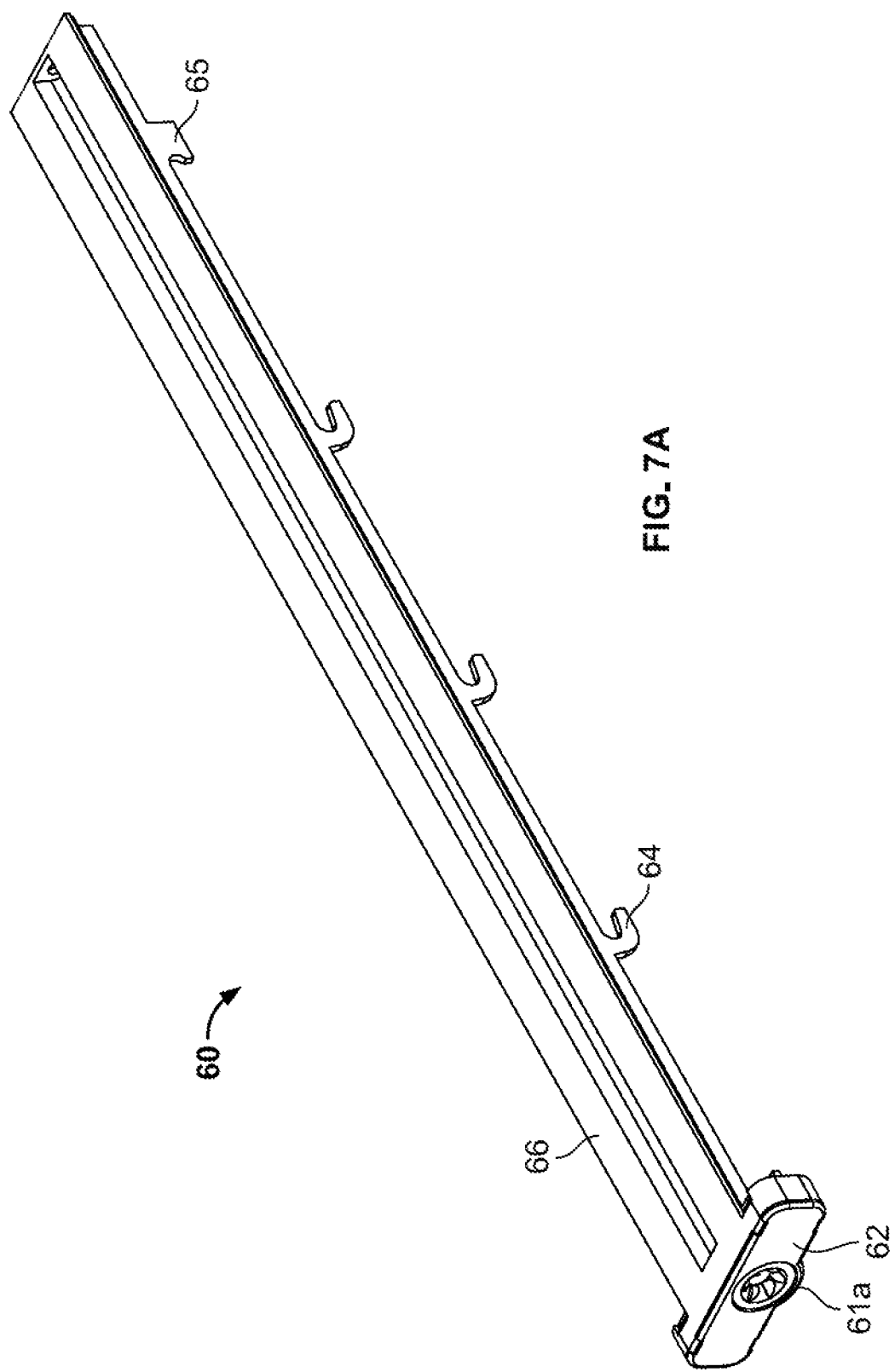

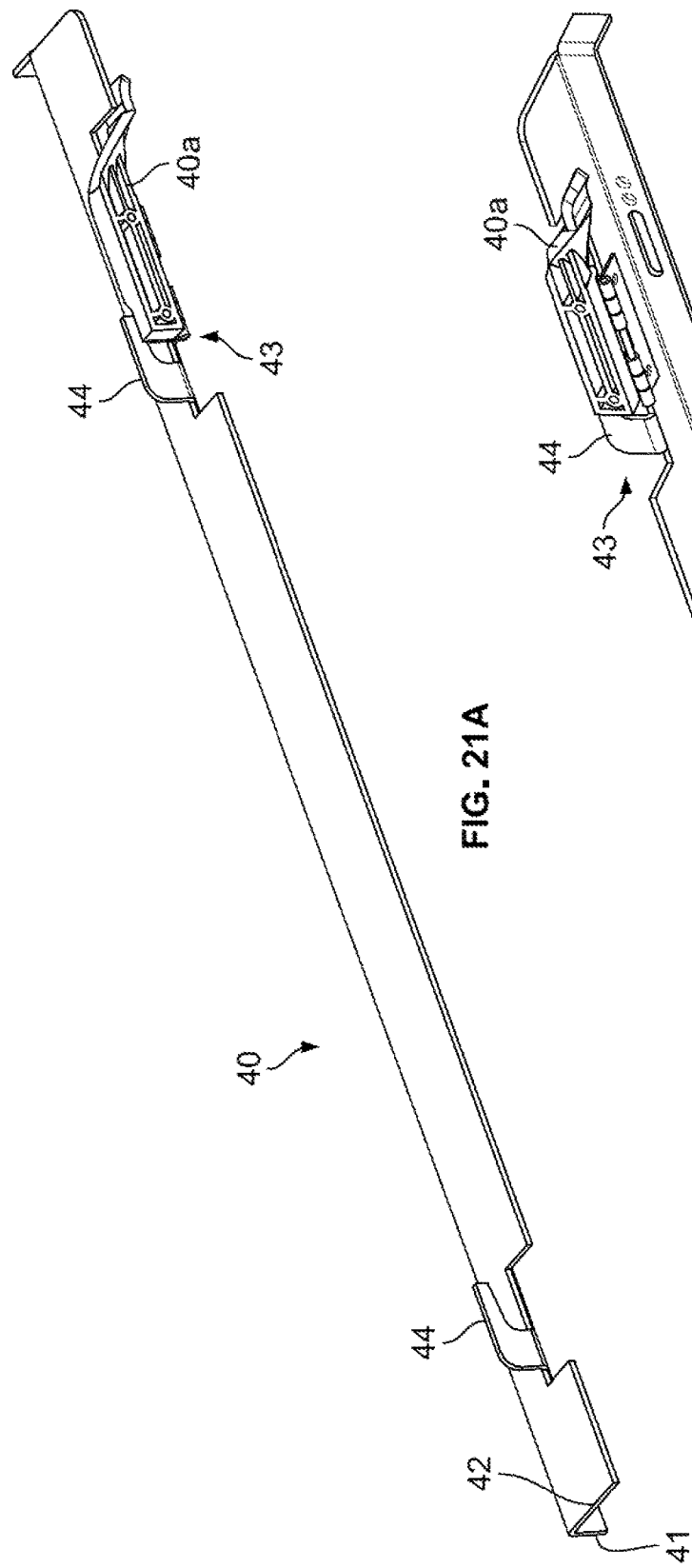
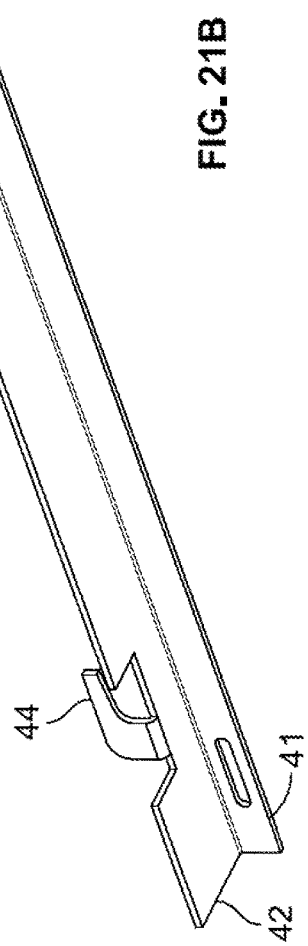
FIG. 21A
FIG. 21B

VENDING MACHINE

FIELD OF INVENTION

The invention pertains to vending machines, such as vending machines which vend food and drink products.

BACKGROUND OF THE INVENTION

Vending machines are common in Western commerce, and are typically used to vend a variety of products including beverages, food snacks, cigarettes, and even larger products such as consumer electronics. In some cases, the conventional vending machines have a clear door, so that a customer may have a faster understanding of the types of products vended, as well as which products are out of stock.

However, such conventional vending machines, whether they have a clear door or not, have several problems. For example, since conventional vending machines are commonly installed in locations having low security or supervision, there is a concern about theft. In some machines, a user may reach their hand into a machine in order to attempt to steal a product. A user may also attempt to "rock" a machine back and forth in an attempt to steal a product. In both situations, there is a concern not only of theft, but also of the thief injuring himself.

Additionally, conventional vending machines typically include numerous mechanical parts which are designed to operate on level ground. Operation of a conventional vending machine on non-level ground may increase wear on various moving parts, and also may endanger users where there is a risk of the machine falling over to one side. Thus, an installer should install the conventional vending machine on substantially level ground, but it is sometimes difficult for the installer to efficiently evaluate whether the ground is sufficiently level.

Additionally, in some conventional vending machines, an XY mechanism is used to retrieve products from shelves and deliver the products to the customer. However, such XY mechanisms can be bulky. As a result, volume within the conventional vending machine is limited, and therefore the amount of product which can be stocked in the conventional vending machine is reduced.

Additionally, in conventional vending machines, there are numerous components which need to be removed and replaced from time to time. Reasons for such removal include mechanical wear, as well as cleaning due to spillage of products. However, in the conventional vending machine, the individual components cannot be quickly removed and replaced, and require the machine to be out of service for an undesirable amount of time.

Additionally, in conventional vending machines, it is known to set different prices for specific products. However, it can be very time consuming to individually set prices product-by-product using the machine's keypad. Similarly, in conventional vending machines, it is known to set different product sizes for specific products, in order to vend the correct number of products regardless of differing product size. However, it can be very time consuming to individually set sizes product-by-product using the machine's keypad.

BRIEF SUMMARY OF THE INVENTION

One feature of the vending machine is a system in which a guillotine door and a delivery door are independently locked to prevent theft. In one embodiment, a vending machine comprises a product area, a transaction area including a delivery bin and a delivery bin door, an interior wall dividing the product area and the transaction area, the interior wall including a guillotine door, a controller, a guillotine door lock, and a delivery bin door lock, wherein the delivery bin door opens and closes to allow or prevent communication between the delivery bin and an outside of the vending machine, wherein the guillotine door opens and closes to allow or prevent communication between the product area and the delivery bin, and wherein the controller is electrically connected to the guillotine door lock and the delivery bin door lock.

In another embodiment, the controller controls the guillotine door lock and the delivery bin door lock such that both the guillotine door lock and the delivery bin door lock are not both unlocked at the same time.

In another embodiment, the vending machine further comprises an XY mechanism in the product area, the XY mechanism including an elevator cup configured to receive a vended product and deliver the vended product to the delivery bin via the guillotine door, a product sensor in the XY mechanism, and a product sensor in the delivery bin, wherein the product sensor in the XY mechanism and the product sensor in the delivery are both electrically connected to the controller, wherein, when the vended product is detected by the product sensor in the XY mechanism, the controller unlocks the guillotine door lock and locks the delivery bin door lock, and wherein, when the vended product is detected by the product sensor in the delivery bin, the controller locks the guillotine door lock and unlocks the delivery bin door lock.

In another embodiment, when the vended product is not detected by both the product sensor in the XY mechanism and the product sensor in the delivery bin, the controller locks both the guillotine door lock and the delivery bin door lock.

In another embodiment, when the vended product is not detected by both the product sensor in the XY mechanism and the product sensor in the delivery bin, the controller locks only the delivery bin door lock.

Another feature of the vending machine relates to a level sensor. In one embodiment, a vending machine comprises a product area having a substantially transparent front panel, and a level sensor disposed on a lower horizontal surface of the product area, wherein the level sensor is disposed at a position viewable through the substantially transparent front panel.

In another embodiment, the level sensor is a bubble level.

In another embodiment, a vending machine, comprises a level sensor disposed on a horizontal surface of the vending machine, a controller, and a display screen, wherein the level sensor comprises one or more accelerometers, wherein the level sensor outputs incline data to the controller, and wherein the controller outputs incline data from the level sensor to the display in a textual or graphical format.

In another embodiment, the display screen displays a warning when the incline data exceeds a predetermined incline.

In another embodiment, the predetermined incline is 3°.

In another embodiment, the vending machine comprises at least one alarm selected from the group consisting of a sound alarm and a light alarm, and the controller actuates the at least one alarm when the incline data exceeds a predetermined incline.

In another embodiment, the predetermined incline is 3°.

In another embodiment, when the incline data exceeds a predetermined incline, the controller suspends vending operation of the vending machine for a predetermined time period.

In another embodiment, the predetermined incline is 3°.

Another feature of the vending machine relates to the location of a Y axis motor. According to one embodiment, a vending machine comprises a product area including an XY mechanism, the XY mechanism including a motor for movement in an X-axis direction and a motor for movement in a Y-axis direction, a transaction area, an interior wall dividing the product area and the transaction area, wherein the motor for movement in the Y-axis direction is disposed in the transaction area.

In another embodiment, the motor for movement in the Y-axis direction is a rotary motor having an output shaft, and the output shaft passes through a hole formed in the interior wall.

In another embodiment, the output shaft is coupled to a product area shaft, such that the output shaft and the product area shaft rotate together.

In another embodiment, a cog is provided on each end of the product area shaft, the cogs each driving a belt or chain, and driving of the belts or chains causes an elevator cup to move in the Y-axis direction, the elevator cup being configured to receive a product from the product area.

In another embodiment, a first cog is provided on the output shaft in the product area, and a second cog is provided on the product area shaft at an end opposite of the output shaft, the first and second cogs each driving a belt or chain, and driving of the belts or chains causes an elevator cup to move in the Y-axis direction, the elevator cup being configured to receive a product from the product area.

In another embodiment, the Y-axis motor in the transaction area is covered by a housing.

In another embodiment, the Y-axis motor is provided at an upper portion of the transaction area.

In another embodiment, the Y-axis motor is provided at a lower portion of the transaction area.

In another embodiment, the vending machine further comprises a plurality of trays for holding a vending product, each tray including a female screw part and a controller, and the XY mechanism further comprises an elevator cup configured to receive the vended product and deliver the vended product to a delivery bin, a male screwdriver part capable of engaging with the female screw part of the tray, and a product sensor which detects the presence or absence of the vended product in the elevator cup. In this embodiment, the controller controls the XY mechanism to move the elevator cup to a position corresponding to a desired vended product, and then controls the male screwdriver to engage and rotate the female screw part, and the female screw part is configured such that rotation of the female screw part will cause the vended product to fall from one of the plurality of trays into the elevator cup. When a product is not detected in the elevator cup by the product sensor within a predetermined time period after the controller controls the male screwdriver part to engage and rotate the female screw part, the controller then controls the XY mechanism to reciprocate in the X-axis direction multiple times.

BRIEF DESCRIPTION OF THE DRAWINGS

FIG. 6 is a front view of the Y-axis motor and portions of the transaction area and product area.

FIG. 7A is a front perspective view of a tray of the vending machine, in which the screw mechanism is omitted.

FIG. 21A is a front upper perspective view of a mounting rail of the vending machine.

FIG. 21B is a front lower perspective view of a mounting rail of the vending machine.

DETAILED DESCRIPTION OF THE INVENTION

Figure 1:
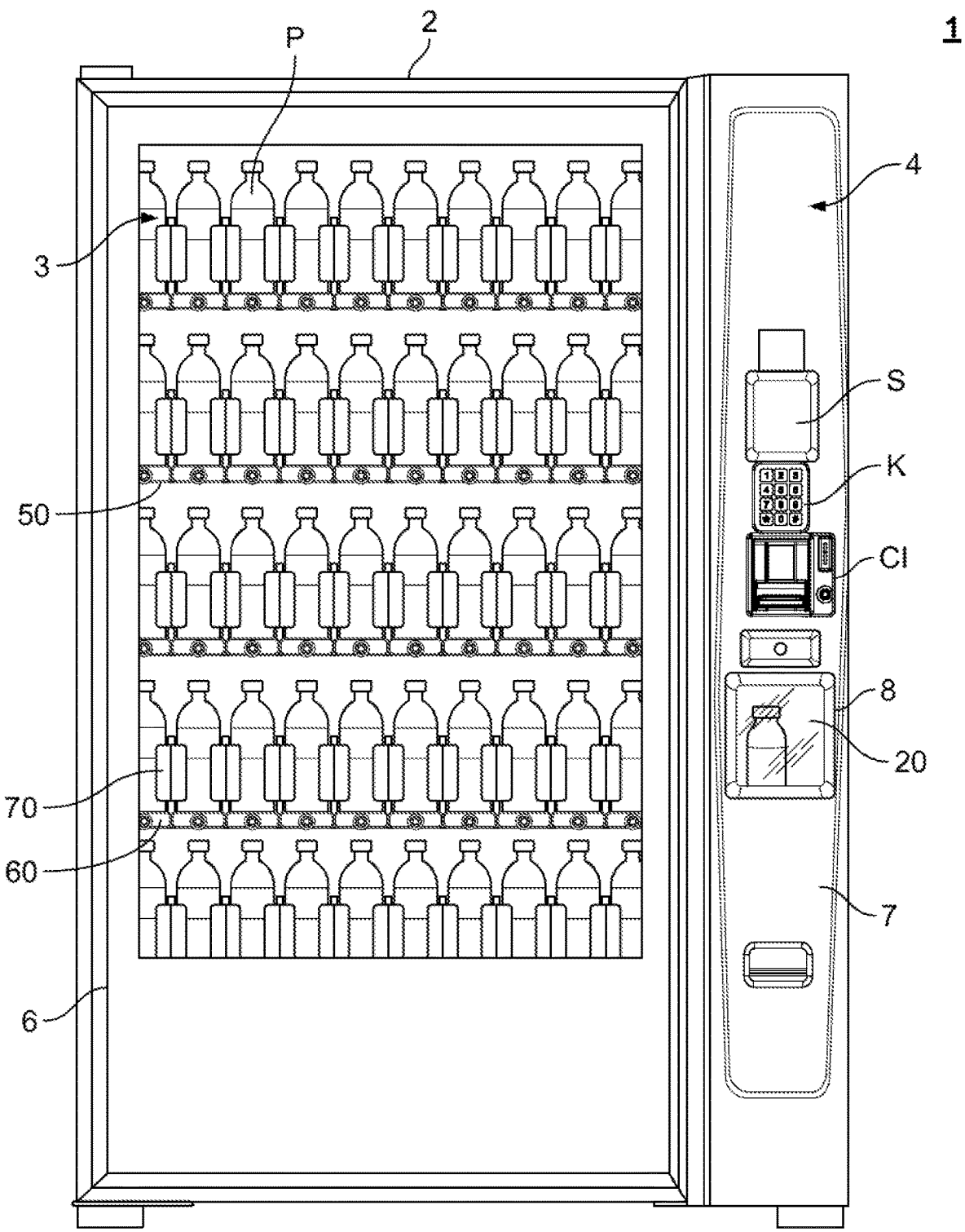
FIG. 1 is a front view of vending machine in a state in which the product area door and transaction door are closed, and the machine is stocked with product.

First, the vending machine 1 will be discussed generally, with reference to FIG. 1. The vending machine 1 includes a cabinet 2 which is open on the front side, and substantially closed on all other sides. Since the vending machine 1 may be used for the vending of cold drinks, the outer walls of the cabinet 2 are typically insulated. For instance, the outer walls of the cabinet 2 may have inner and outer layers formed of a metal, with insulation such as polyurethane foam disposed therebetween. As another example, the inner wall may be formed of a plastic material.

Figure 3A:
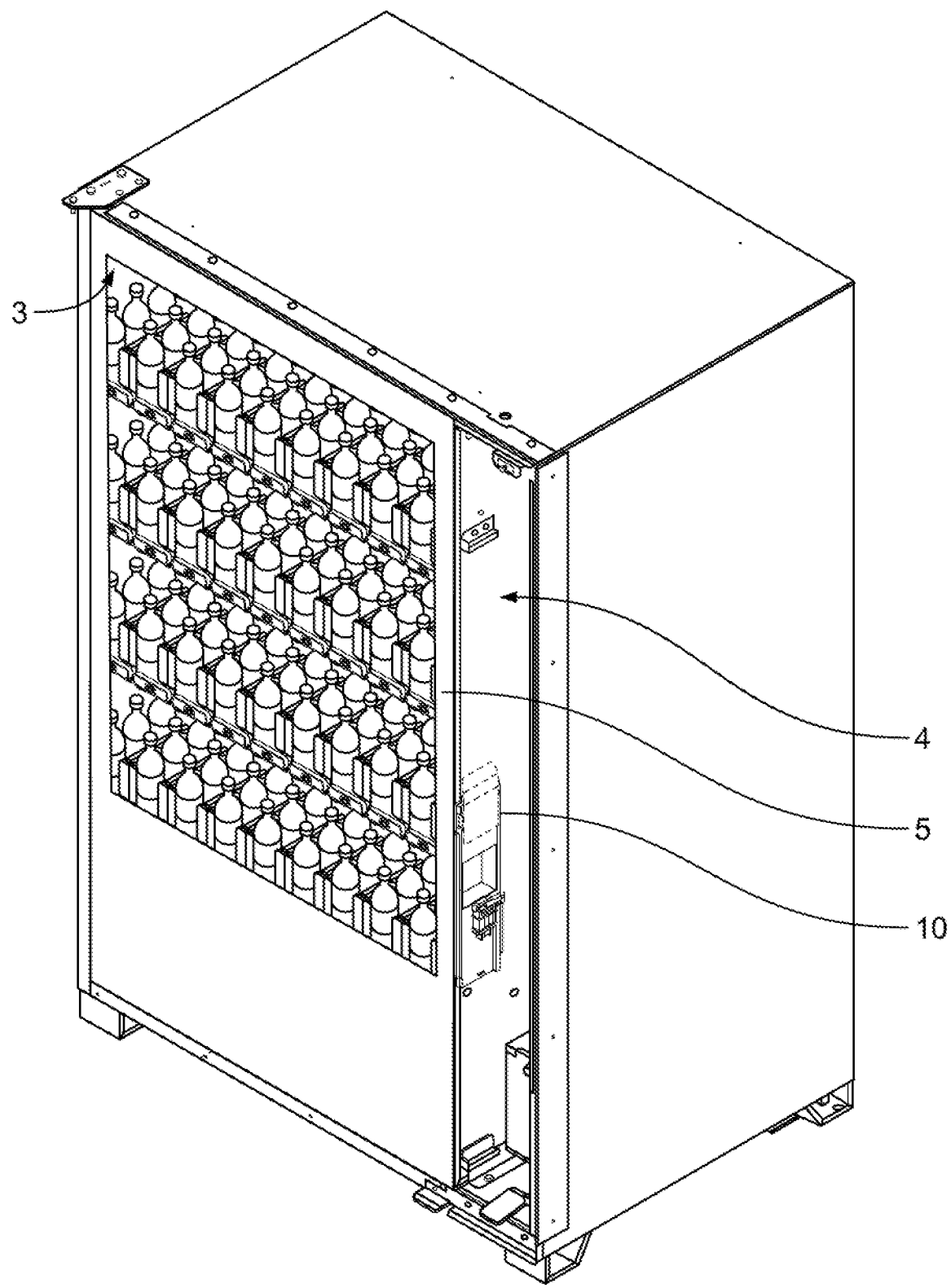
FIG. 3A is a front perspective view of the vending machine in which the product area door and transaction door are omitted, in a non-vending state.

As shown in FIG. 3A, the cabinet 2 is divided into a product area 3 and a transaction area 4 by an interior wall 5 disposed vertically in the cabinet 2. Preferably, the interior wall 5 may be formed of substantially the same insulated material as the exterior walls of the cabinet 2, but this is not required. The interior wall 5 is inserted into the cabinet 2 at a desired position, and is secured by appropriate hardware, such as brackets and bolts. In the illustrated embodiments, the interior wall 5 divides the width of the cabinet 2 such that the product area 3 is approximately 80% of the width of the cabinet 2 and the transaction area 4 is approximately 20% of the width of the cabinet 2, but this is not particularly limited. Due to the flexibility of the positioning of the interior wall 5, the same part for the interior wall 5 can be adapted for use in vending machines of different widths.

Returning to FIG. 1, the front side of the vending machine 1 is covered by two parts. First, a product area door 6 covers the product area 3, and is typically clear. This clear door 6 is typically hinge mounted, so as to swing open for loading of products P. Typically, the clear door 6 is framed by metal or plastic, and one or more panels of glass, plexiglass, transparent plastic or the like forms most of the surface area of the clear door 6. This allows for the customer to view the products P and have immediate awareness of any products which may be sold out, as well as observe the vending process. However, the product area door 6 may be substantially opaque.

Meanwhile, in the transaction area 4, the front side of the cabinet 2 is covered by a transaction door 7. The transaction area 4 includes the controller C of the vending machine 1, as well as other electronic equipment. The transaction door 7 includes, for example, a display screen S, a selection input pad K, currency input hardware CI, and a delivery bin 8. The display screen S can display, for example, the prices of the products P, the amount of currency input, the amount of change due, or any other message such as "Thank you." The selection input pad K is typically an alphanumeric keypad which the customer uses to input the location of the desired product. The currency input hardware CI may be any conventional hardware used to receive and analyze input paper currency or coins. The currency input hardware CI may also be credit/debit card processing hardware, or hardware for receiving contactless payments using Bluetooth, Wi-Fi, Near-Field Communication (NFC) or the like. The delivery bin 8 is an area which receives the vended product P from the product area 3, and from which the customer retrieves the product after completion of the vending process. The delivery bin 8 may have a delivery bin door 20 that can open to communicate with an exterior of the vending machine 1 and which remains closed during some or all of the vending process. The delivery bin 8 may also be illuminated. The delivery bin door 20 may be transparent or opaque. Each of the above-mentioned components will be discussed in greater detail below.

The product area 3 includes a series of racks 50, each rack 50 including multiple trays 60 mounted thereon. Each tray 60 may hold multiple units of the product P, such as cans or bottles of soda. The number of racks 50 and trays 60 per rack 50 is not particularly limited, and will depend on the dimensions of the product area 3. The number of units of product P held by each tray 60 is not particularly limited, and depends on the depth of the machine 1 as well as the depth of the product P in question.

Figure 3B:
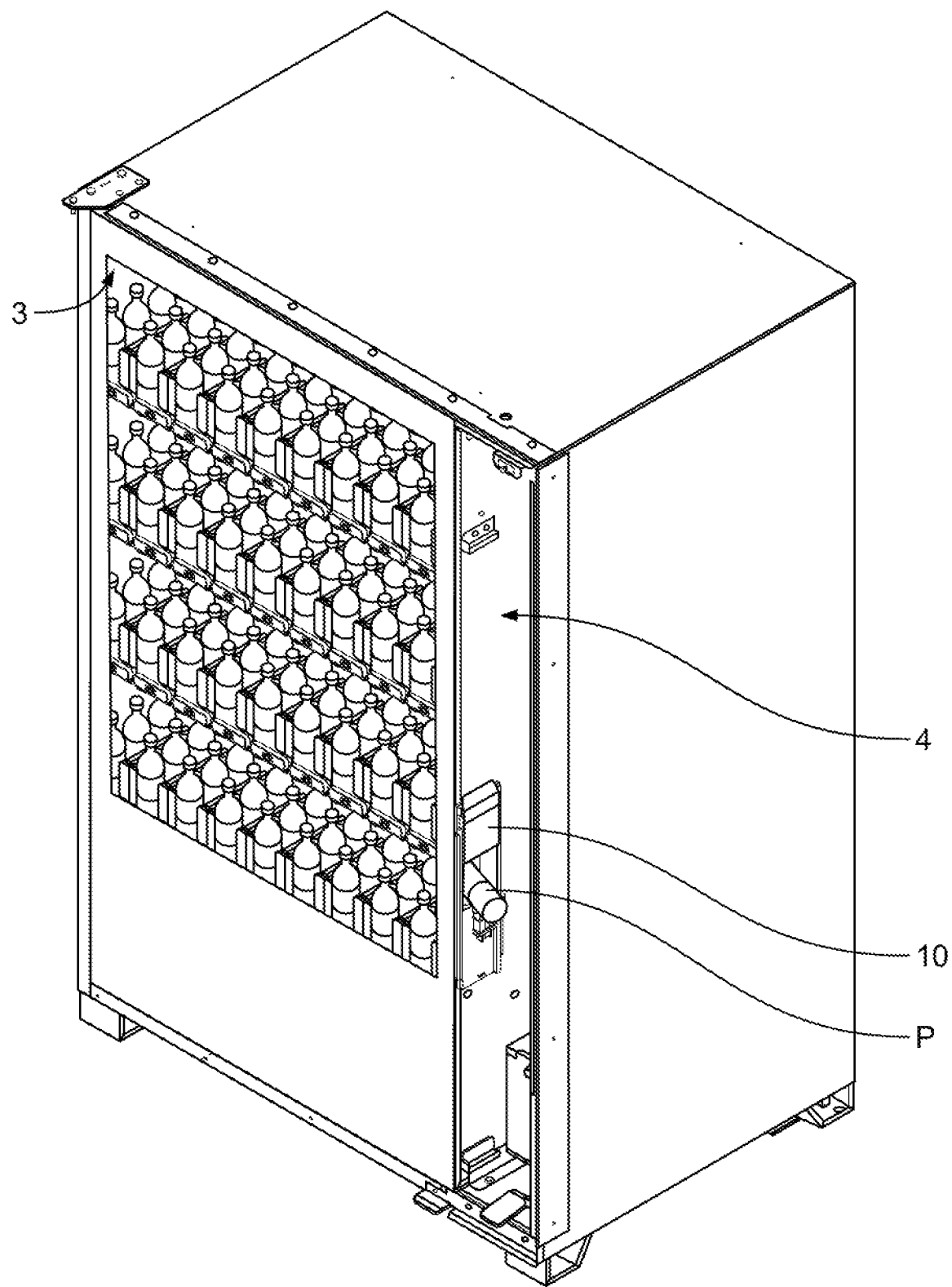
FIG. 3B is a front perspective view of the vending machine in which the product area door and transaction door are omitted, during vending.
Figure 4:
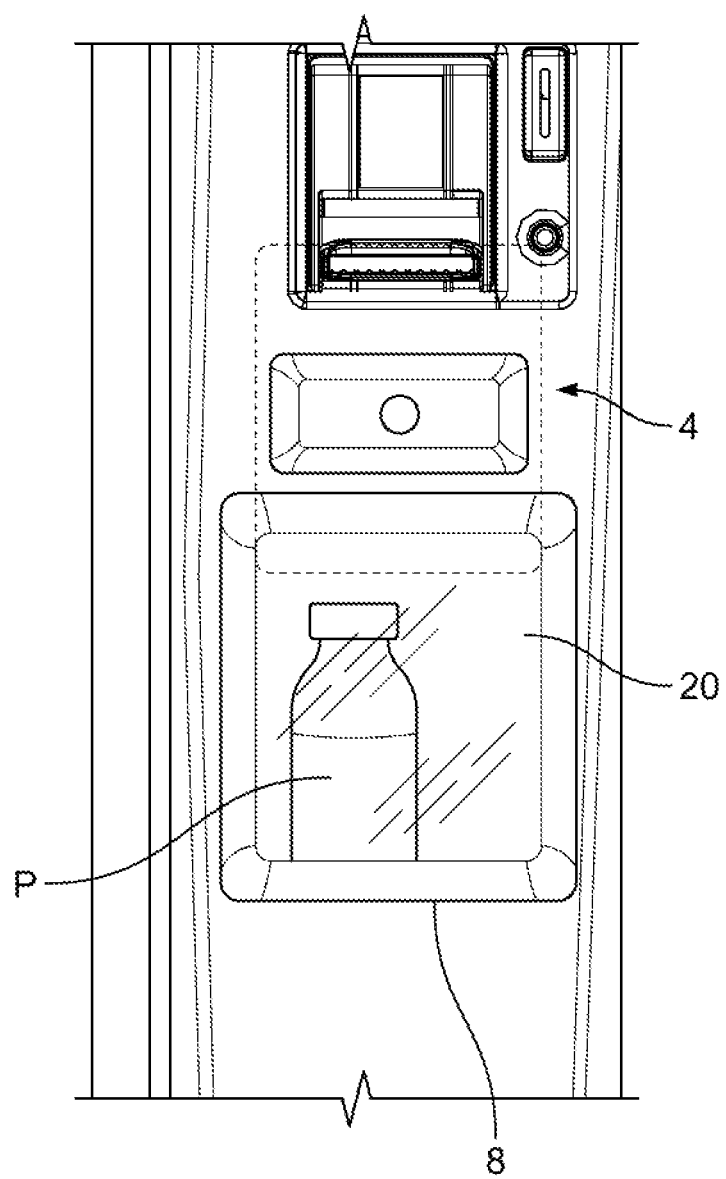
FIG. 4 is a front view of the delivery bin and delivery bin door of the vending machine.
Figure 19:
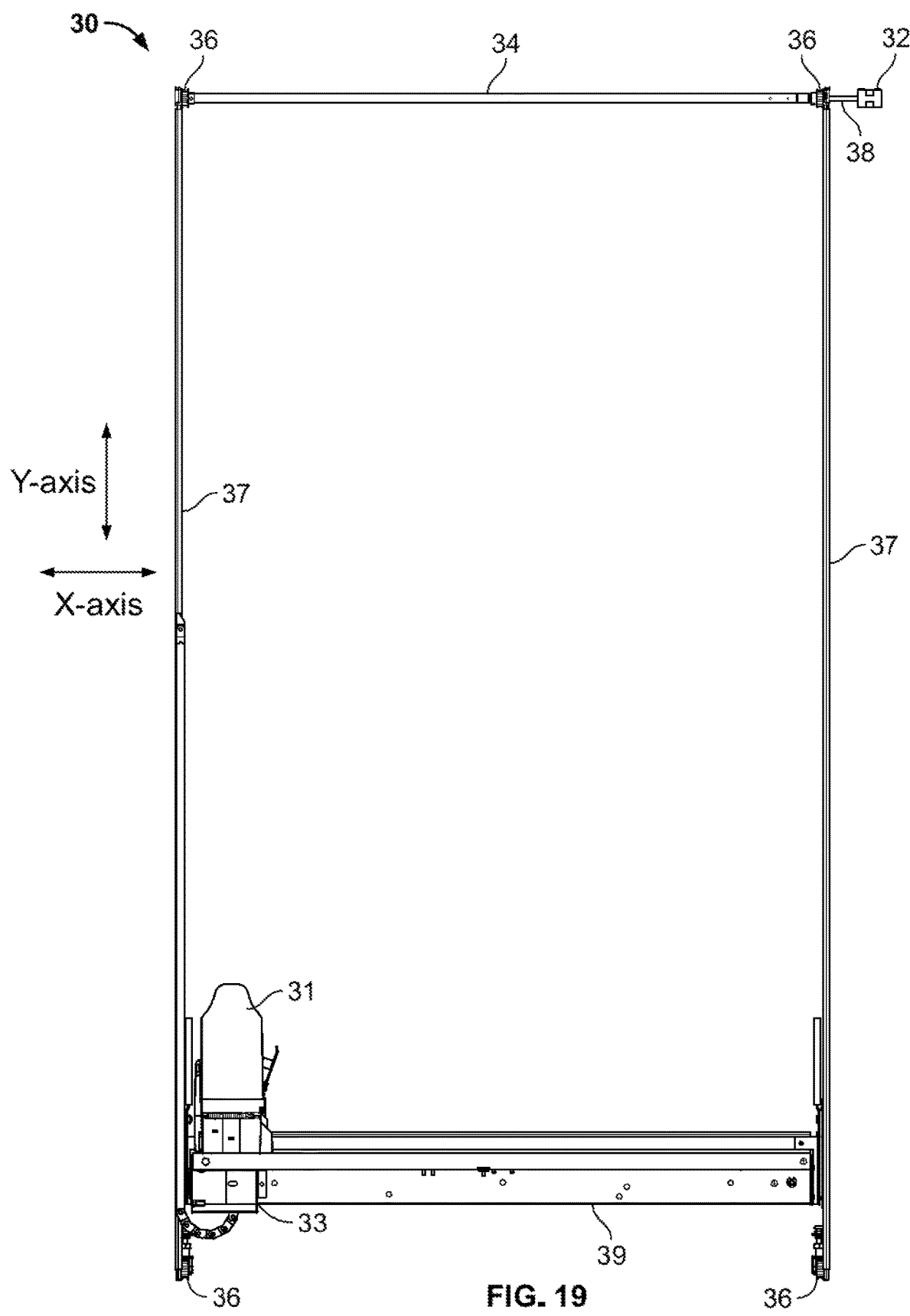
FIG. 19 is a view of the XY mechanism of the vending machine.

The product area 3 also includes an XY mechanism 30 which includes an elevator cup 31. The XY mechanism is illustrated in FIG. 19. The XY mechanism 30 is able to position the elevator cup 31 at any position corresponding to a desired rack 50 and a desired tray 60. The XY mechanism 30 is also able to move the elevator cup 31 to a position adjacent to a guillotine door 10 formed in the interior wall 5, which is illustrated in FIG. 3A. When open, the guillotine door 10 allows communication between the product area 3 and the delivery bin 8. See FIG. 3B. This will be discussed in greater detail below.

As shown in FIG. 19, the XY mechanism 30 may include a Y-axis motor 32 which drives an upper shaft 34 provided at the top of the product area 3. A lower shaft may be provided at the bottom of the product area 3. A belt or chain 37 is provided on cogs 36 on the left and right sides of the upper shaft 34 and the lower shaft. Alternatively, the lower shaft may be replaced with two freewheeling cogs 36 on which the belt or chain 37 is provided. A horizontal frame 39 is provided on the belt or chain 37, such that operation of the Y-axis motor 32 causes rotation of the upper shaft 34 and movement of the belt or chain 37 to cause the horizontal frame 39 to move upwards or downwards within the product area 3. Alternatively, the Y-axis motor 32 may drive the lower shaft at the bottom of the product area 3 instead of the upper shaft 34 at the top of the product area 3. Thus, the XY mechanism 30 can position the horizontal frame 39 at any Y-axis position 32 of the product area 3. The Y-axis motor 32 may be a rotary motor such as a stepper motor.

The elevator cup 31 is provided on the horizontal frame 39 such that as the horizontal frame 39 moves upwards and downwards, the elevator cup 31 also moves upwards and downwards. The horizontal frame 39 is provided with an X-axis motor 33 which moves the elevator cup 31 in a left-right direction within the horizontal frame 39. As such, the elevator cup 31 can be moved to any X-axis position of the product area 3. Thus, using the XY mechanism 30 which includes a Y-axis motor 32 and an X-axis motor 33, the elevator cup 31 can be moved to any desired XY position within the product area 3. The X-axis motor 33 may be a linear motor, or a rotary motor such as a stepper motor.

In most situations, the products P to be vended are refrigerated, either due to health concerns (in the context of perishable beverages such as milk) or customer preference. Thus, the product area 3 can additionally include refrigeration equipment. The refrigeration equipment includes conventional hardware, such as a thermostat, compressor, condenser coil, evaporator coils, and liquid or gaseous refrigerant. The refrigeration equipment may be disposed at any location in the vending machine 1, but it is desirable to provide the refrigeration equipment at a location which is less visible to customers, such as the lower portion of the cabinet 2.

Note that in all discussions herein, the directions "left," "right," "top," "bottom," "front," "rear" and the like are relative to a customer facing the product area 3 door and the transaction door 7 of the vending machine. The axes described as X, Y, and Z correspond to the left-right direction, the top-down direction and the front-rear direction, respectively.

Next, specific features of the vending machine 1 will be described in greater detail. First, a level sensor will be described. In deciding upon the installation position of a vending machine, it is desirable for the machine 1 to be as level as possible. If the machine 1 is not level, this may be dangerous to users (risk of machine falling on the user) or may cause undue wear of various internal components. Ideally, the angle of inclination of the vending machine 1 relative to gravity in any direction is less than or equal to 3°.

Figure 5:
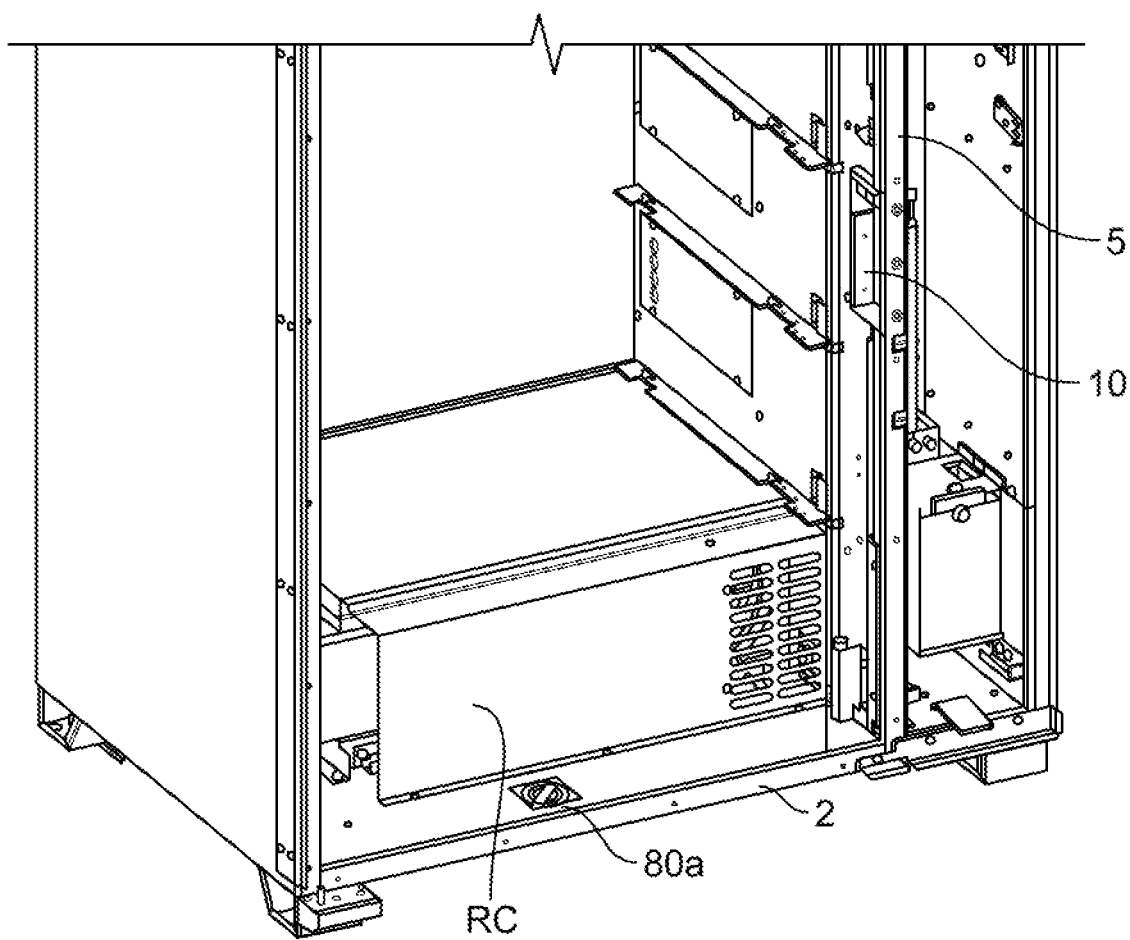
FIG. 5 is a front perspective view of the lower portion of the vending machine in which the product area door, transaction area door, racks and trays are omitted.
Figure 7B:
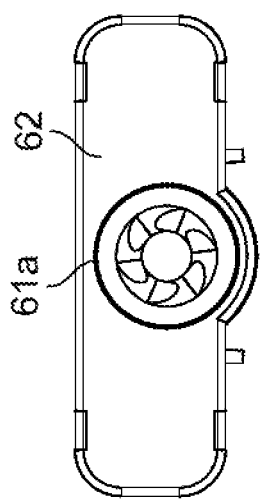
FIG. 7B is a front view of a tray of the vending machine.
Figure 7C:
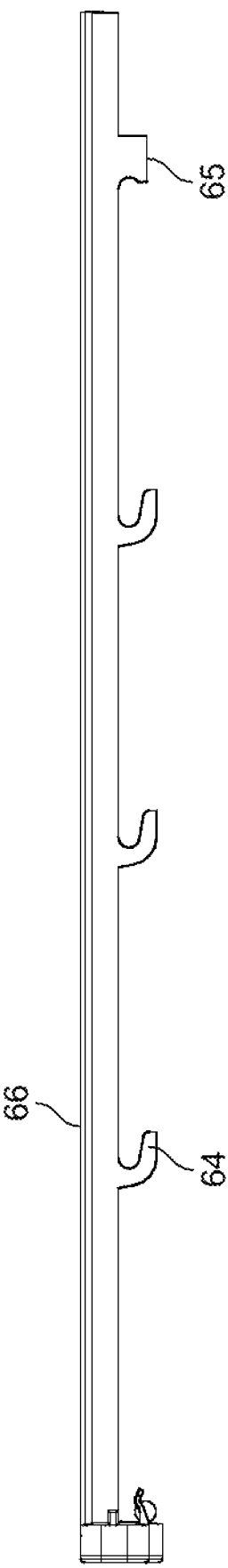
FIG. 7C is a side view of a tray of the vending machine.
Figure 7D:
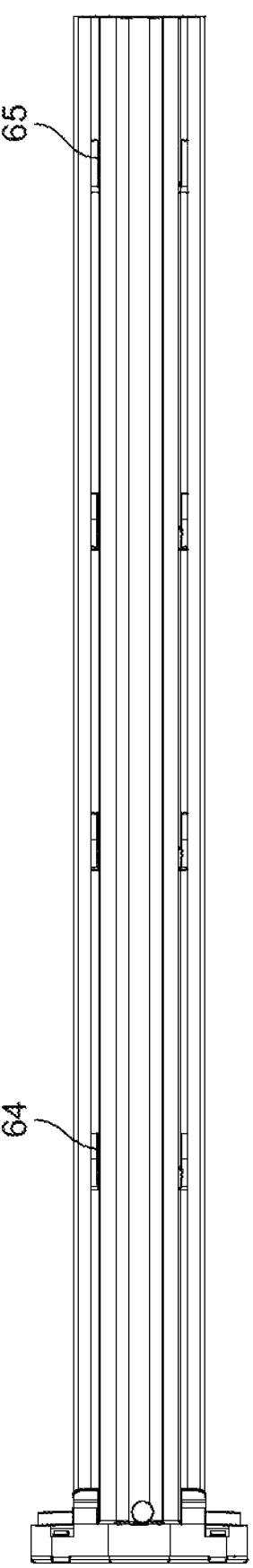
FIG. 7D is a bottom view of a tray of the vending machine.
Figure 7E:
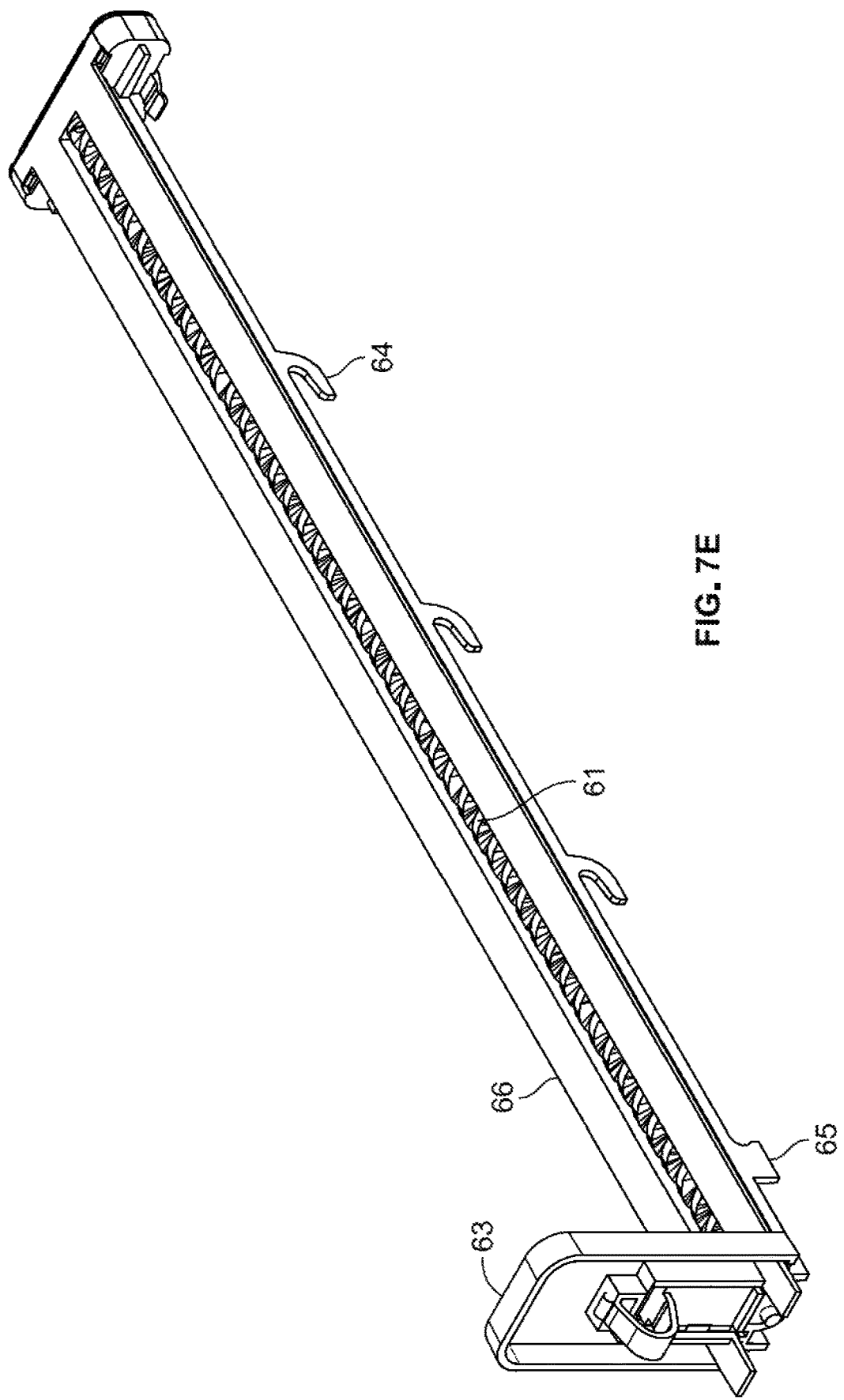
FIG. 7E is a rear perspective view of a tray of the vending machine including the screw mechanism.

In order to ensure level installation, the vending machine 1 may include a level sensor. As a first example, as shown in FIG. 5, this level sensor may be a bubble level 80a disposed on a horizontal surface of the vending machine 1. The bubble level 80a may be disposed at a position which is not easily seen by the customer when the machine 1 is stocked with product, but is easily visible to an installer of an empty machine. Thus, an installer can refer to the bubble level 80a and adjust the vending machine 1 as necessary. For example, the bubble level 80a can be disposed in a recess within the lower interior surface of the cabinet 2. Alternatively, the bubble level 80a can be disposed directly on the lower interior surface of the cabinet 2, without a recess being provided. The bubble level 80a may be circular. Alternatively, the bubble level 80a may be two separate or integrated linear bubble levels with one linear bubble level extending in an X-axis direction and the other linear bubble level extending in a Z-axis direction.

Figure 12:
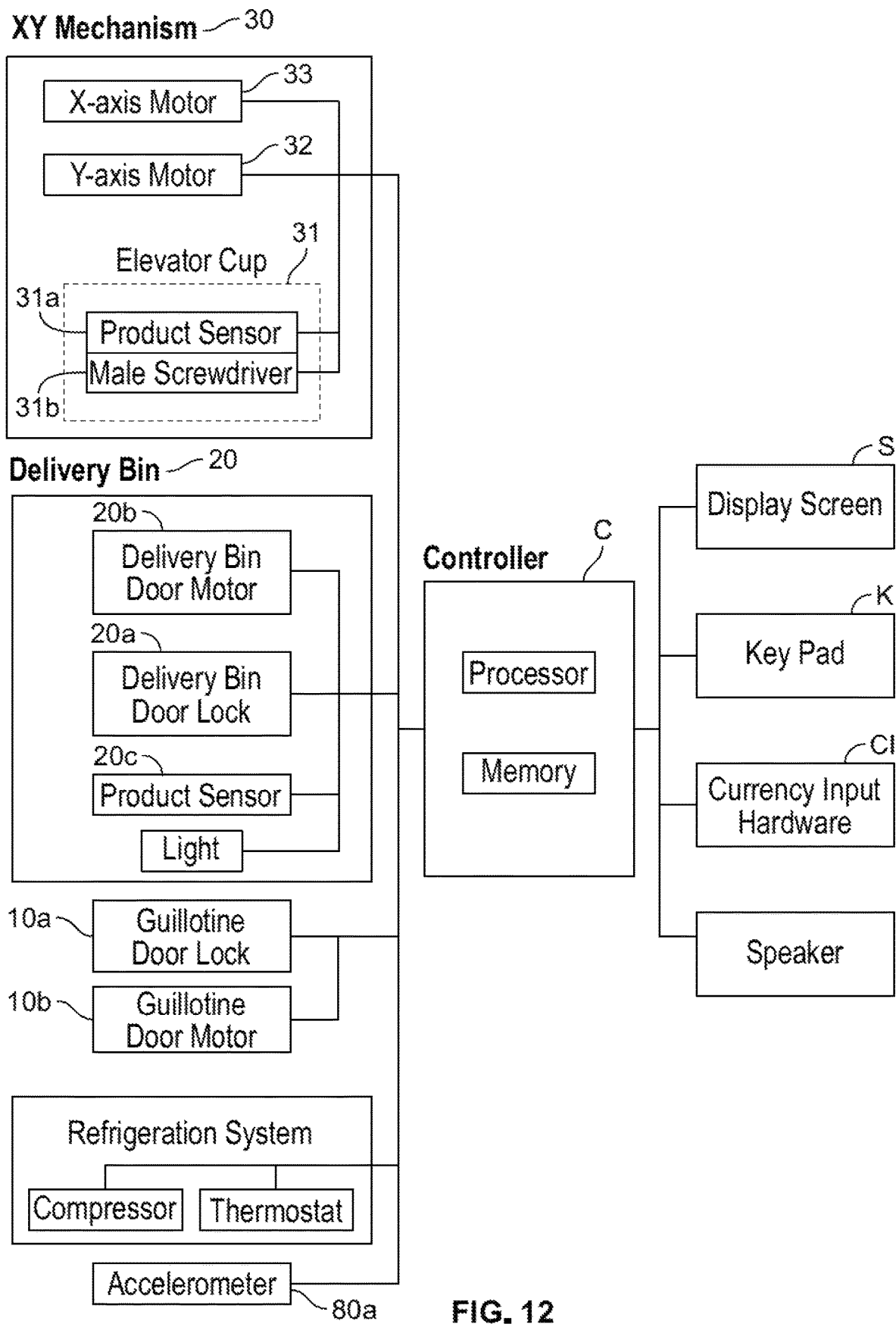
FIG. 12 is a block diagram showing various electronic components of the vending machine.

As another example, the level sensor may be at least one accelerometer 80b electrically connected to the controller C of the vending machine 1. See FIG. 12. In this case, the accelerometer 80b may be disposed on any horizontal surface of the vending machine 1, either in the product area 3 or the transaction area 4. In a configuration mode, the controller C may display graphical or textual data from the accelerometer 80b on the display screen S in the transaction area 4. Thus, an installer could refer to the display screen S while adjusting the vending machine 1 as necessary.

Additionally, if the level sensor is at least one accelerometer 80b electrically connected to the controller C of the vending machine 1, the accelerometer 80b may serve additional functions beyond the initial configuration of the machine. For instance, it is not uncommon for vandals to "rock" a vending machine forward and rearward in an attempt to steal products. This is undesirable not only due to theft, but also due to the risk of the machine falling on the potential thief. In order to mitigate this problem and to discourage such behavior, the controller C may be configured to constantly monitor output from the accelerometer 80b. The controller C may also be configured to take one or more courses of actions upon detection of sudden inputs from the level sensor consistent with "rocking" of the machine. Such an input consistent with "rocking" may include inclinations of the machine 1 relative to gravity greater than a predetermined amount, such as 3°, in alternating directions within a predetermined period of time, such as 10 seconds.

Upon receiving such information, the controller C may, for example, output a warning message to the display screen S, temporarily suspend vending activity for a predetermined time period (such as 10 minutes), permanently suspend vending activity until a service person resets the machine, or output instructions to lighting and sound hardware to emit alarm sounds or lights. A combination of these actions is also possible.

Next, the XY mechanism 30 will be discussed in greater detail. Typically, in vending machines having an XY mechanism 30, both the Y-axis motor 32 for movement along the Y axis and the X-axis motor 33 for movement along the X axis are disposed within the product area 3. However, in the disclosed vending machine, the Y-axis motor 32 is disposed outside the product area 3, in the transaction area 4.

Specifically, as shown in FIG. 6, the Y-axis motor 32 may be mounted at the top of the transaction area 4. The Y-axis motor 32 includes a rotating output shaft 38. This output shaft 38 passes through a hole 5a formed in the interior wall 5 which divides the transaction area 4 and the product area 3. The output shaft 38 may extend substantially the full width of the racks 50 in the product area 3.

However, more preferably, the output shaft 38 is relatively short, so as to allow easy installation of the Y-axis motor 32 in the transaction area 4. In this case, the output shaft 38 of the Y-axis motor 32 can be coupled to a product area shaft such as the upper shaft 34. This product area shaft may extend substantially the full width of the racks 50 in the product area 3 and may drive one or more of the belts or chains 37. The output shaft 38 of the Y-axis motor 32 and the product area shaft may be joined by any appropriate hardware, such as screws, gears or the like. In one embodiment, the cogs 36 which drive the belts or chains 37 are both disposed on the product area shaft. In another embodiment, one cog is disposed on the product area shaft and the other cog is disposed on the output shaft 38.

In some embodiments, the output shaft 38 of the Y-axis motor 32 will have a diameter which is significantly smaller than the hole 5a formed in the interior wall 5, which the output shaft 38 passes through. In this case, it may be desirable to fill the gap between the diameter of the hole 5a and the diameter of the output shaft 38 with a gasket 5b. The gasket 5b may be made of any appropriate material, such as rubber, plastic or fabric. This configuration avoids the need for precision machining of the hole 5a in the interior wall 5 to be a nearly identical diameter as the output shaft 38. The gasket 5b then serves to thermally insulate the transaction area 4, as well as avoid passing of dust and debris between the product area 3 and transaction area 4. The gasket 5b also helps to support the output shaft 38 so as to reduce vibrations which may reduce the life of the Y-axis motor 32.

The Y-axis motor 32 may be any conventional rotary motor, so long as it produces sufficient torque to move the downstream components of the XY mechanism 30. Optionally, the Y-axis motor 32 may be disposed within a protective casing in the transaction area 4. Such a protective casing helps to protect the Y-axis motor 32 from dust and debris which may be in the transaction area 4, and could reduce the life of the Y-axis motor 32.

By placing the Y-axis motor 32 in the transaction area 4 instead of the product area 3, the amount of usable volume in the product area 3 is increased, allowing for more product P to be stocked and for the visual appearance of the machine to be improved. Additionally, when disposed within the transaction area 4, the Y-axis motor 32 may be protected from low temperature, spilled liquid product, dust and the like, giving rise to a longer life of the motor. Furthermore, placement of the Y-axis motor 32 in the transaction area 4, and linkage to the product area shaft, allows for quicker replacement of the Y-axis motor 32, easier adjustment of tension of the belt or chain 37, and simpler connection to other electronic elements of the vending machine 1. Although the discussion above contemplates the Y-axis motor 32 and product area shaft being disposed at the top of the transaction area 4, alternatively, the Y-axis motor 32 and product area shaft could also be disposed at the bottom of the transaction area 4.

Next, customer retrieval of the product P will be explained in greater detail. The structure of the elevator cup 31 and delivery of the product P from the elevator cup 31 to the delivery bin 8 may be similar to that described in U.S. Pat. No. 7,222,749. Briefly, the product P is delivered to the elevator cup 31 (this will be discussed in greater detail below), then the XY mechanism 30 moves the elevator cup 31 to a position along the interior wall 5, above the guillotine door 10. Lowering of the elevator cup 31 may cause the guillotine door 10 to open by interaction between tabs on the elevator cup 31 and the guillotine door 10. However, the guillotine door 10 could also be opened by a motor 10b. In the event that the guillotine door 10 is opened by a motor 10b, the door may open either upwardly or downwardly. The product P is then tilted and passed from the elevator cup 31 to the delivery bin 8 via the opening of the guillotine door 10. See FIGS. 3A and 3B. Note that after passing through the opening of the guillotine door 10, the product P passes through a passage (not illustrated) which terminates in the delivery bin 8.

In the disclosed vending machine 1, as noted above, the delivery bin 8 further includes a delivery bin door 20 which remains closed during some or all of the vending process. The delivery bin door 20 may be transparent or opaque. The delivery bin door 20 may retract vertically or may open by rotation about a vertical axis. The delivery bin door 20 may be actuated a delivery bin door motor 20b which is a linear motor or a rotary motor. Alternatively, the delivery bin door 20 may be manually openable by the user.

In the disclosed vending machine 1, the guillotine door 10 in the interior wall 5 and the delivery bin door 20 are each provided with electrically actuated locks 10a and 20a, which are independently controlled by the controller C. The locks 10a and 20a may be disposed within the guillotine door 10 and the delivery bin door 20, or may be adjacent to these doors. The specific type of lock is not limited, so long as the lock can be electrically actuated to secure the respective door. Additionally, the vending machine may include sensors, which inform the controller C about whether the guillotine door 10 and the delivery bin door 20 is in an open or closed state. For example, a sensor informing about open or closed state of a door may be a Hall effect sensor.

In one embodiment, during a non-vending state, or during a portion of the vending operation before the guillotine door 10 is opened, guillotine door 10 is locked and the delivery bin door 20 is unlocked. Of course, the guillotine door 10 must be unlocked before it can be opened. Once the guillotine door 10 is unlocked, the delivery bin door 20 may be locked. Upon completion of the delivery of the product P to the delivery bin 8, the delivery bin door 20 may be unlocked and the guillotine door 10 may be locked. After unlocking of the delivery bin door 20, the delivery bin door 20 may be opened by the delivery bin door motor 20b.

The delivery bin 8 may include a product sensor 20c. This product sensor 20c may be, for example, a weight sensor or an optical sensor, and may be disposed within the delivery bin 8 or adjacent to the delivery bin 8. Indication by the product sensor 20c that a product is present in the delivery bin allows the controller C to know whether to actuate one or more of the delivery bin door motor 20b (if present), delivery bin door lock 20a, guillotine door motor 10b (if present) and guillotine door lock 10a. In another embodiment, the delivery bin door 20 may be locked at all times, except when a product P is detected in the delivery bin 8.

Accordingly, it is possible to ensure that both the guillotine door 10 and the delivery bin door 20 are not unlocked simultaneously. If the guillotine door 10 and the delivery bin door 20 are unlocked simultaneously, it is possible that a thief could insert their arm into product area 3 via the guillotine door 10 and the delivery bin door 20 in an attempt to steal a product P. However, if one of the guillotine door 10 and the delivery bin door 20 is always locked, such attempted theft is not possible.

As noted above, the delivery bin 8 may include a product sensor 20c, which detects presence of the product P. The delivery bin 8 may also be provided with one or more lights, which may be white or colored. Accordingly, upon delivery of product P into the delivery bin 8, not only can the controller C instruct the delivery bin door 20 to open, but the controller C can also instruct lights in the delivery bin 8 to illuminate. This serves as a signal to the customer that vending is complete, and the product P is ready for retrieval. Additionally, the controller C may include a timer which counts a duration that a product P has been present in the delivery bin 8. After a predetermined time period of the product P being present in the delivery bin 8, the controller C may alert the user to retrieve the product P by flashing the light in the delivery bin 8 or changing the color of the light in the delivery bin 8 (for example, from white to red). The controller C may also instruct a speaker to emit an audible alert. Such an operation reminds the customer to retrieve the product P, in the event that they were distracted by another task.

Next, attachment of the racks 50 in the product area 3 will be explained with reference to FIGS. 21A-24. As explained above, one or more racks 50 are provided in the product area 3. However, over time, the racks 50 may need to be removed, for example for cleaning. In the disclosed vending machine 1, the racks 50 may be easily removed and replaced by a quick-release system.

Figure 11:
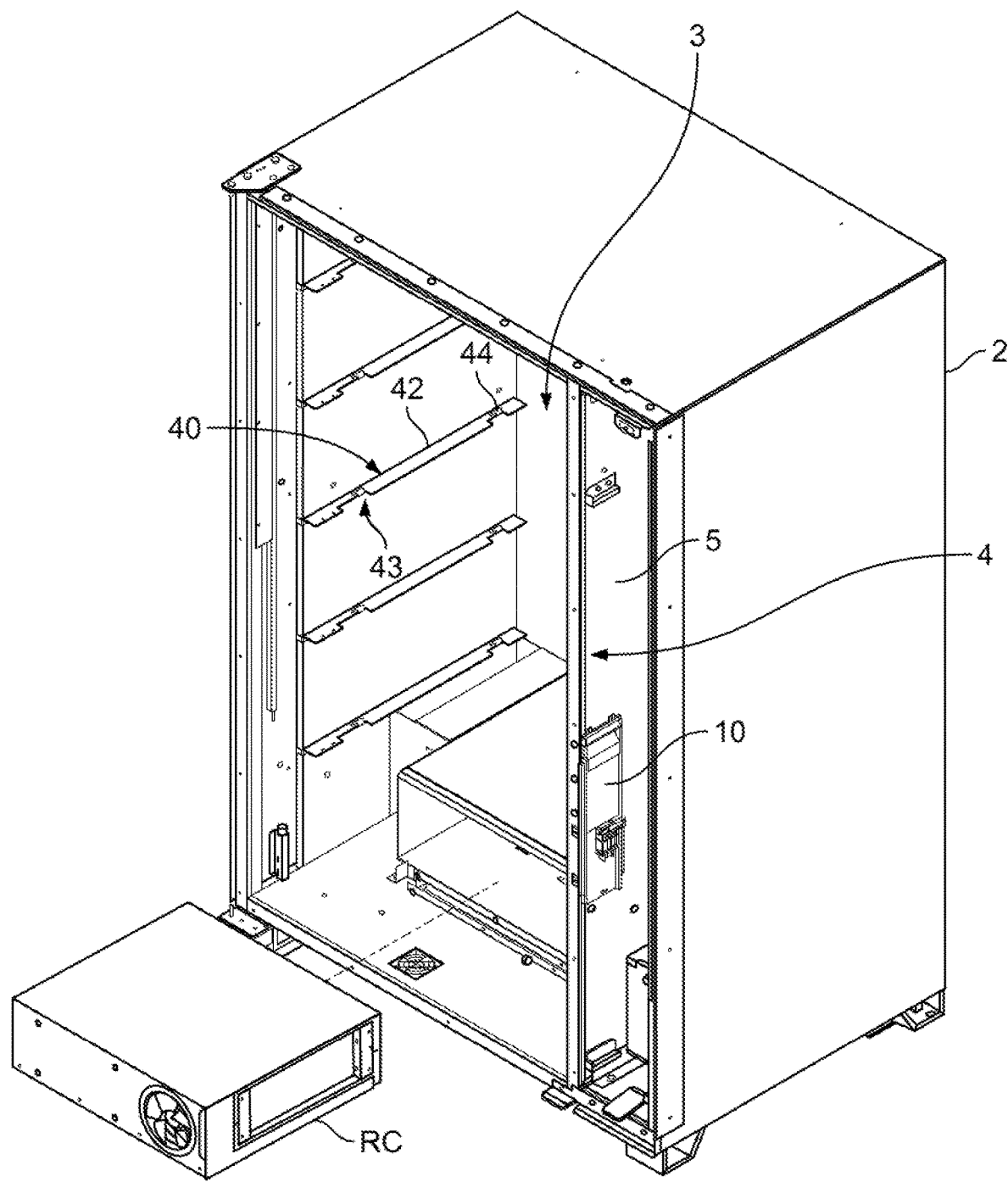
FIG. 11 is a front perspective view showing installation of a refrigeration cassette in the vending machine.

At each position where a rack 50 is to be inserted, there is provided a mounting rail 40 on the left and right walls of the product area 3 (the right wall being the interior wall 5 dividing the product area 3 and the transaction area 4). See FIGS. 5 and 11. Each mounting rail 40 extends substantially from the front of the product area 3 to the rear of the product area 3. Each mounting rail 40 includes a first portion 41 which is substantially flush with the left or right wall of the product area 3, and a second portion 42 which is substantially orthogonal to the left or right wall of the product area 3, so as to project towards the center of the product area 3. The second portion 42 includes at least one notch area 43 with a reduced width and a hook 44 which projects upwardly and forwardly from the notch area 43. Typically, the second portion 42 will include a notch area 43 at the front and rear thereof. A retainer flap 40a is fixed to the underside of the notch area 43, such that it may rotate about an axis extending in the front-rear direction of the product area 3. The retainer flap 40a may be spring loaded, and may be biased towards a position in which the retainer flap 40a extends in a vertical direction. The front portion of the retainer flap 40a may be curved.

Each rack 50 includes a plurality of left-right extending bars 51 and front-rear extending bars 52. The rack 50 may be made of a bare metal material, such as steel, aluminum or an alloy. Alternatively, the rack 50 may be coated with a protective paint. As another option, the rack 50 could be made of a resin material.

When installed, the rack 50 is positioned such that the rack 50 rests on the second portion 42 of the mounting rail 40, and one left-right extending bar 51 is disposed in the recess of a hook 44 of each notch area 43. Before positioning the rack 50 on the mounting rail 40, or simultaneously with positioning the rack 50 on the mounting rail 40 (particularly in the case that the retainer flap 40*a* has a curved front portion), the spring-loaded retainer flap 40*a* is rotated to a position such that substantially no portion of the flap 40*a* extends above the second portion 42 of the mounting rail 40. Then, the retainer flap 40*a* is allowed to return to a position which extends above the second portion 42 of the mounting rail 40, either by spring biasing, or by forced rotation by the installer. The rear-most edge of the retainer flap 40*a* is spaced from recess of the hook 44 by a distance which is substantially the same as the diameter of the left-right extending bar 51 of the rack 50. Thus, the retainer flap 40*a* prevents the rack 50 from moving in a front-rear direction, and the hook 44 prevents the rack 50 from moving in an up-down direction. Removal is the opposite of installation. See FIG. 23, which illustrates the rack 50 as installed, and FIG. 24 which illustrates the rack 50 in the process of installation/removal.

Next, attachment of the trays 60 to the racks 50 in the product area 3 will be explained. As explained above, each rack 50 includes one or more trays 60 disposed side-by-side. Typically, each rack 50 will include 5-10 trays 60, but this number may vary. Each tray 60 includes a screw mechanism 61 for delivery of the product P (to be discussed below). Although the trays 60 may be made of any material, it is preferable that the trays 60 are made of a plastic material. Over time, the trays 60 may need to be removed, for example, for cleaning, or for replacement due to wear of the screw mechanism 61. In the disclosed vending machine 1, the trays 60 may be easily removed and replaced by a quick-release system.

As noted above, each rack 50 includes a plurality of left-right extending bars 51 and front-rear extending bars 52. Each rack 50 may also include vertically extending portions 53 at a predetermined interval in the left-right direction of the rack 50, in order to separate vended products P from each other. The tray 60 may have substantially the same width as the interval between the vertically extending portions 53.

Although this will be discussed in greater detail below, each tray 60 includes a front face 62, a floor portion 66, a screw mechanism 61 extending in a gap in the floor portion 66, and a rear wall 63, which moves on the screw mechanism 61. See FIGS. 7A-7E. The tray 60 may include a plurality of hooks 64 which project downwardly and rearwardly from the underside of the floor portion 66. The tray 60 may also include a holding tab 65 which projects downwardly from the underside of the floor portion 66. In a preferred embodiment, each tray 60 includes six hooks 64 disposed adjacent to the left and right edges of the floor portion 66, at three different positions in the front-rear direction of the tray 60. In this preferred embodiment, each tray 60 also includes two holding tabs 65, disposed at the left and right side edges of the floor portion 66, at a position which is rearward of the hooks 64. The hooks 64 and positioning tabs 65 are spaced such that each hook 64 can hold a left-right extending bar 51 of the rack 50 therein, and the frontward edge of each holding tab 65 can abut a rearward surface of a left-right extending bar 51. Although the tray 60 is described such that the hooks 64 face rearward and the holding tabs 65 are near the rear of the tray 60, it is alternatively possible for the trays 60 to have hooks 64 which face forward and holding tabs 65 near the front of the tray 60.

Figure 8:
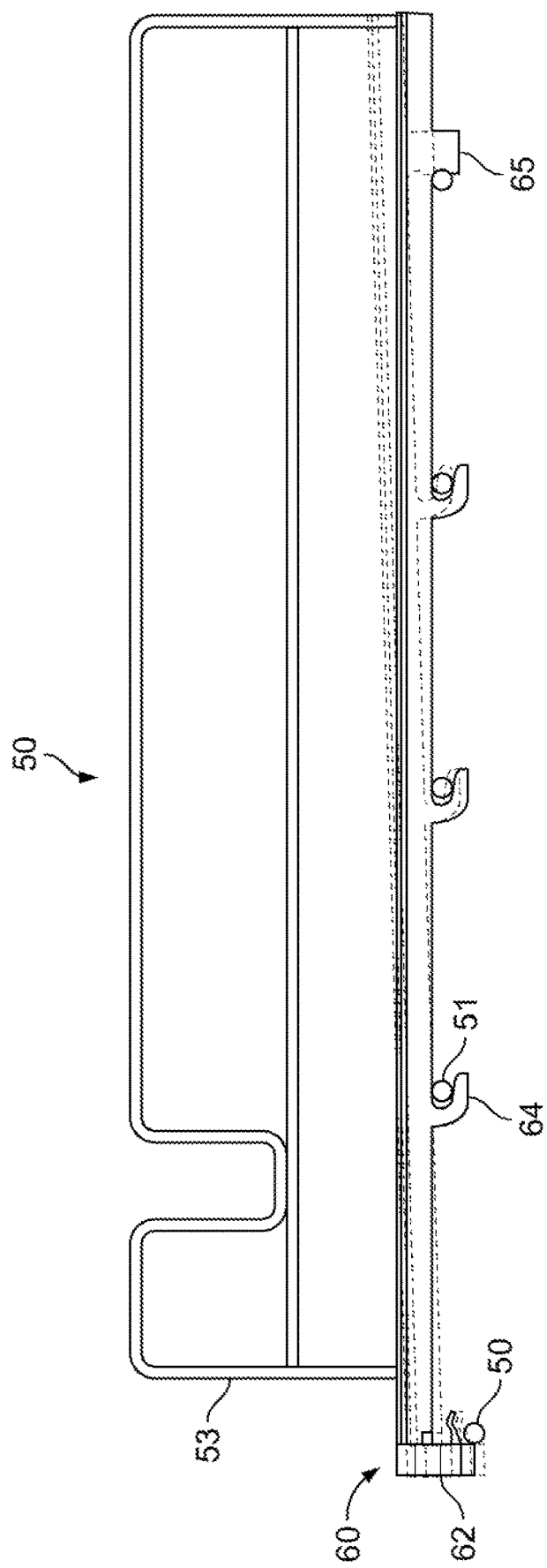
FIG. 8 is a side view showing installation of a tray on a rack of the vending machine.
Figure 9A:
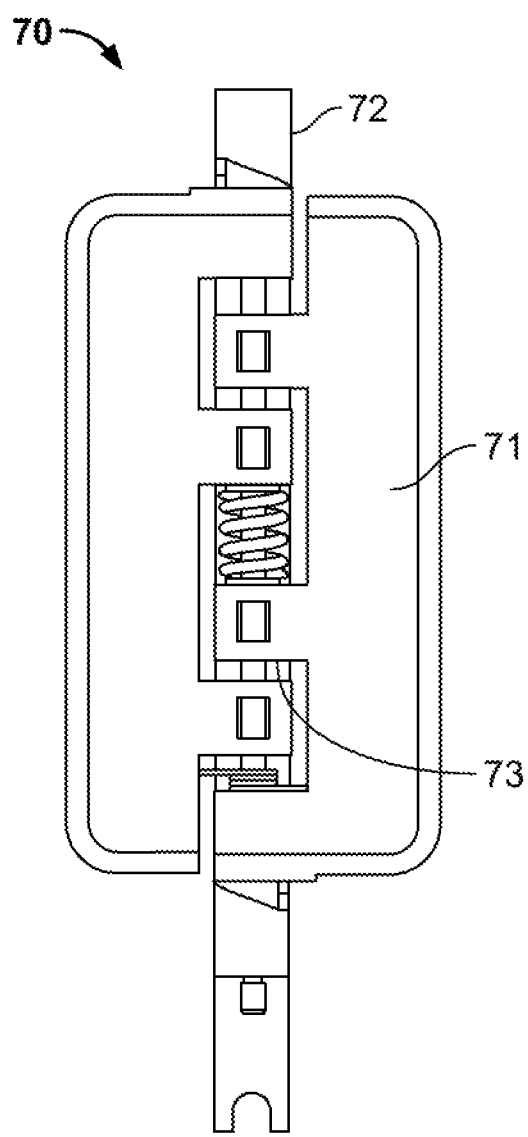
FIG. 9A is a front view of a gate assembly of the vending machine.
Figure 9B:
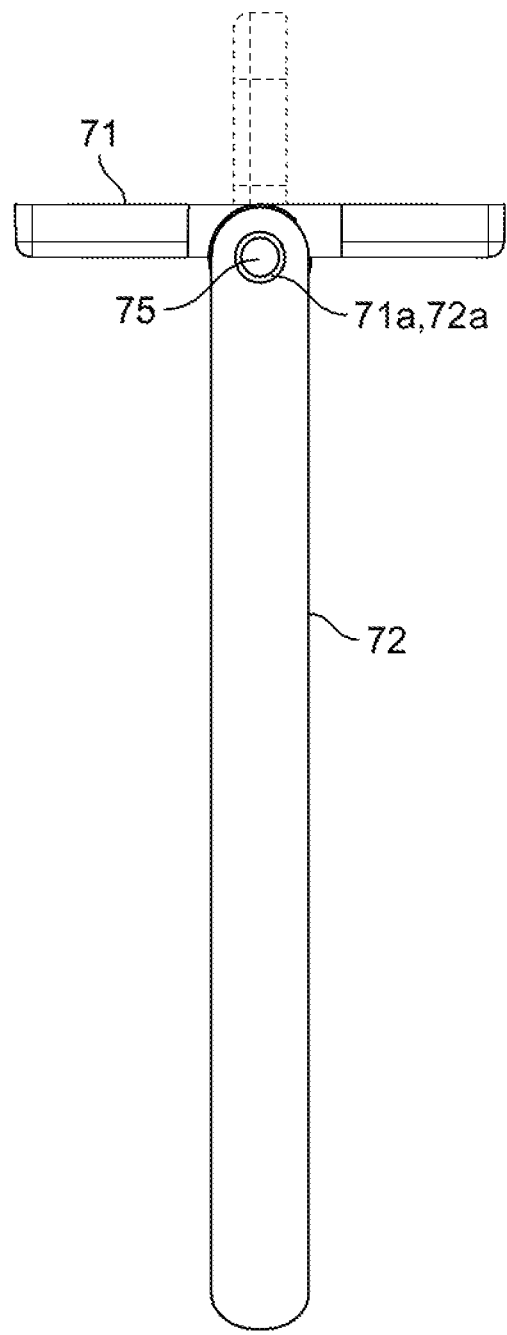
FIG. 9B is a top view of a gate assembly of the vending machine.
Figure 9C:
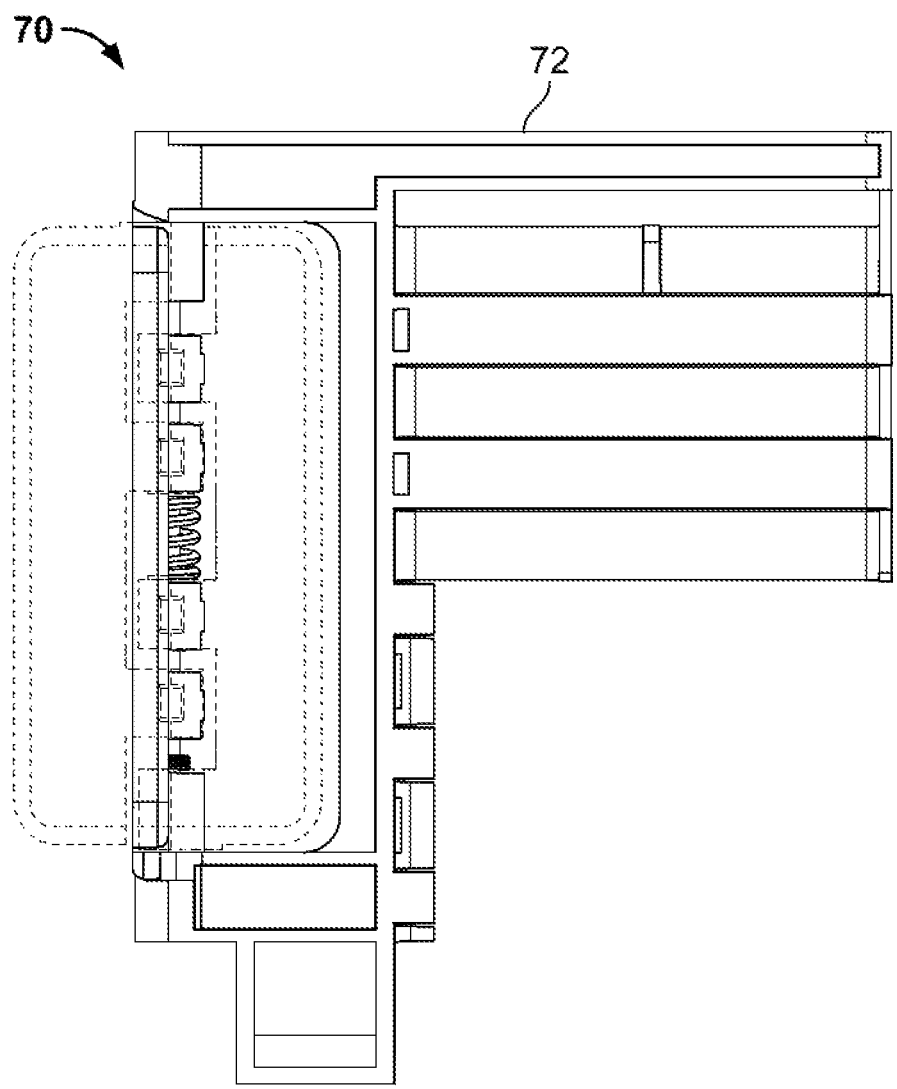
FIG. 9C is a side view of a gate assembly of the vending machine.
Figure 9D:
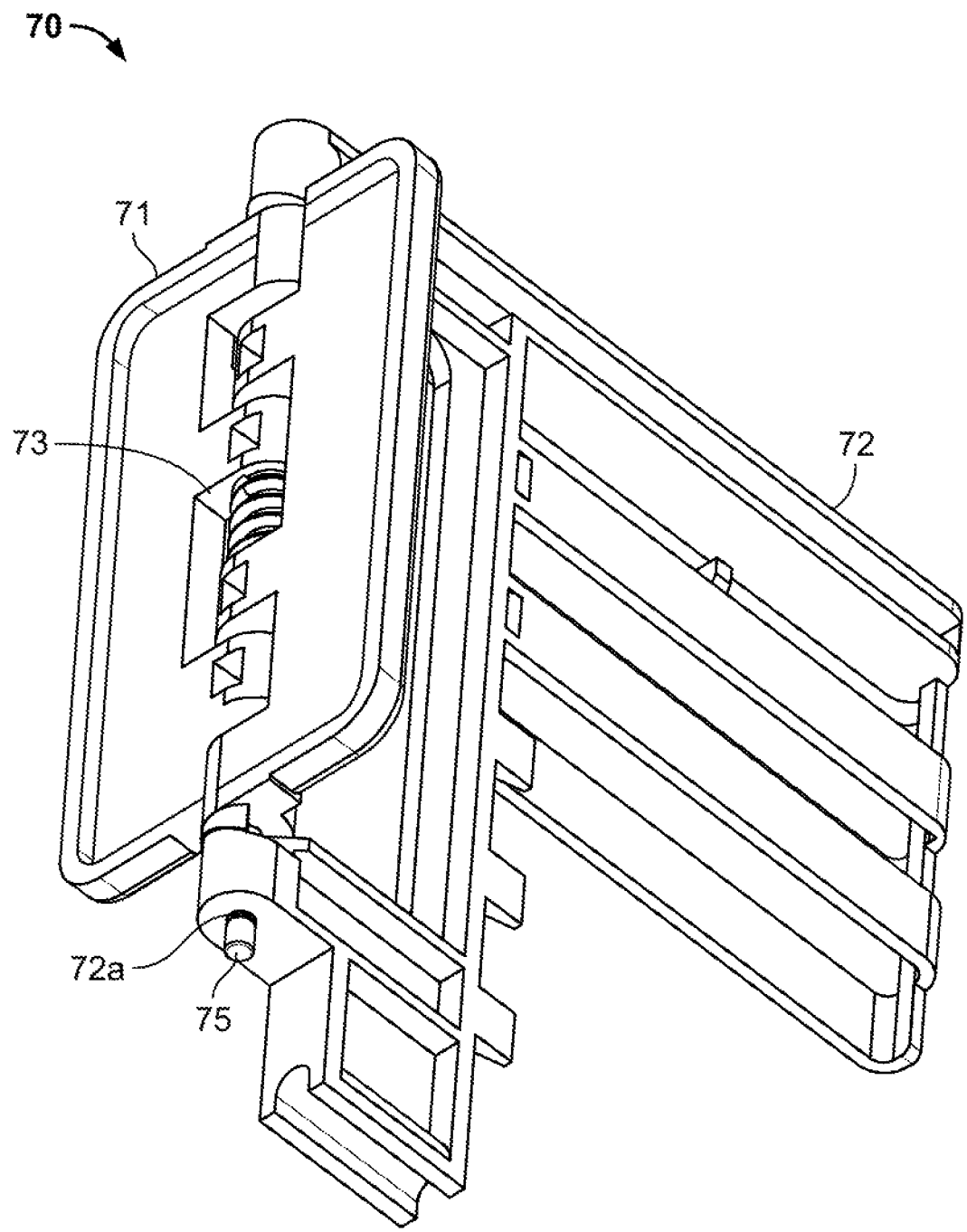
FIG. 9D is a front bottom perspective view of a gate assembly of the vending machine.

As shown in FIG. 8, in order to install the tray 60, the user aligns the tray 60 such that the frontward surface of a left-right extending bar 51 is disposed in each of the hooks 64. At this stage, the tray 60 will be slightly angled, such that the rear of the tray 60 is higher than the front of the tray 60, and the holding tabs 65 will be disposed above a left-right extending bar 51 of the rack 50. This is illustrated in broken lines in FIG. 8. Then, the user pushes down slightly on the rear of the tray 60, forcing the front surface of the holding tabs 65 to abut the rearward surface of the left-right extending bar 51. This is illustrated in solid lines in FIG. 8. According to this configuration, the tray 60 is substantially immobilized on the rack 50, in a front-rear direction (by the hooks 64 and holding tabs 65), in an up-down direction (by the hooks 64), and in a left-right direction (by the vertically extending portions 53 of the rack 50). Removal is the opposite of installation. Note that in FIGS. 7A-7D and 8, the rear wall 63 is omitted for ease of understanding. The rear wall 63 will be explained in greater detailed below.

Next, Applicant will discuss gate assemblies 70 provided on each rack 50. As noted above, the rack 50 includes vertically extending portions 53 which serve to divide each rack 50 to separate vended products P from each other. It is desired to have gate assemblies 70 which prevent a product P from accidentally falling, or prevent two products P from being vended when one was intended. Like the trays 60, these gate assemblies 70 may need to be removed, for example, for cleaning, or for replacement due to wear. In the disclosed vending machine 1, the gate assemblies 70 may be easily removed and replaced by a quick-release system.

Figure 10:
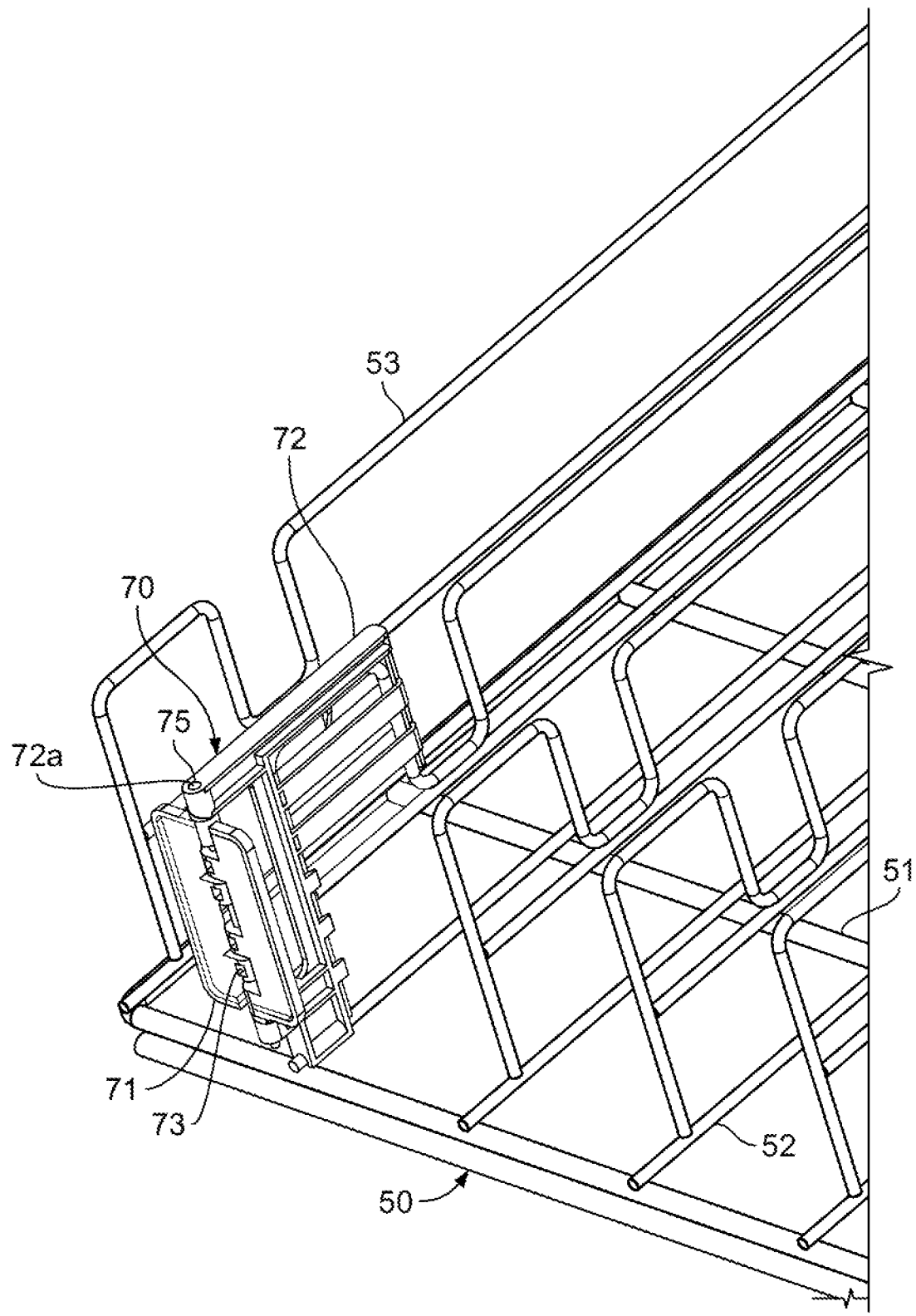
FIG. 10 is a view explaining installation of a gate assembly on a rack of the vending machine.

The gate assemblies 70 of the disclosed vending machine 1 include a rack mounting portion 72 and at least one gate piece 71 which rotates relative to the rack mounting portion 72. See FIGS. 9A-9D. As shown in FIG. 10, the vertically extending portions 53 of the rack 50 have may an inverted U shape portion. The rack mounting portion 72 is configured to be hollow, such that the rack mounting portion 72 can be slid onto, or off of, the inverted U-shape portion of the rack 50.

The gate assemblies 70 each also include at least one gate piece 71, but in most cases two gate pieces 71. The gate pieces 71 are provided on opposite sides of the rack mounting portion 72, in the left-right direction. Each gate piece 71 includes at least one arm portion 73 which projects towards the rack mounting portion 72, and which has a vertically-extending hole 71*a* formed therein. A front portion of the rack mounting portion 72 also includes a vertically-extending hole 72*a*. The gate pieces 71 are fixed to the rack mounting portion 72 by a rod 75 which extends through the holes 72*a* and 71*a* in the rack mounting portion 72 and the gate pieces 71. The gate pieces 71 are each able to rotate approximately 180°, and are spring biased towards a position which is orthogonal to the extending direction of the rack mounting portion 72 (solid lines in FIG. 9B).

Accordingly, the gate pieces 71 hold the vended product P to prevent a product from falling, or inadvertent vending of two products P. However, due to the fact that the gate pieces 71 can rotate, the gate pieces 71 do not interfere with loading of product P and do not interfere with vending of product P. In the case of loading the product P, the gate pieces 71 will be rearwardly rotated by the product P. In the case of vending the product P, the gate pieces 71 will forwardly rotated by the product P. However, when product P is not being loaded or vended, the gate pieces 71 will bias towards a position which blocks product P from falling.

Additionally, it is noted that there may be a situation where the product P has been partially moved forward out of the tray 60, but has not been received by the elevator cup 31. In this situation, it is possible that the product P is "stuck" and is being held by the gates. Thus, the controller C may be programmed such that if the product P is not detected by a product sensor 31*a* in the elevator cup 31 within a predetermined time period after rotating the screw mechanism 61 of the tray 60 (see discussion below), the controller C enters a stuck-product mode. For example, this time period may be 1 second, 2 seconds, 5 seconds or 10 seconds. In the stuck-product mode, the XY mechanism is operated such that the X axis motor causes the elevator cup 31 mechanism to rapidly reciprocate back-and-forth in the left and right directions, in an effort to free the "stuck" product P from the gate pieces 71.

Figure 20:
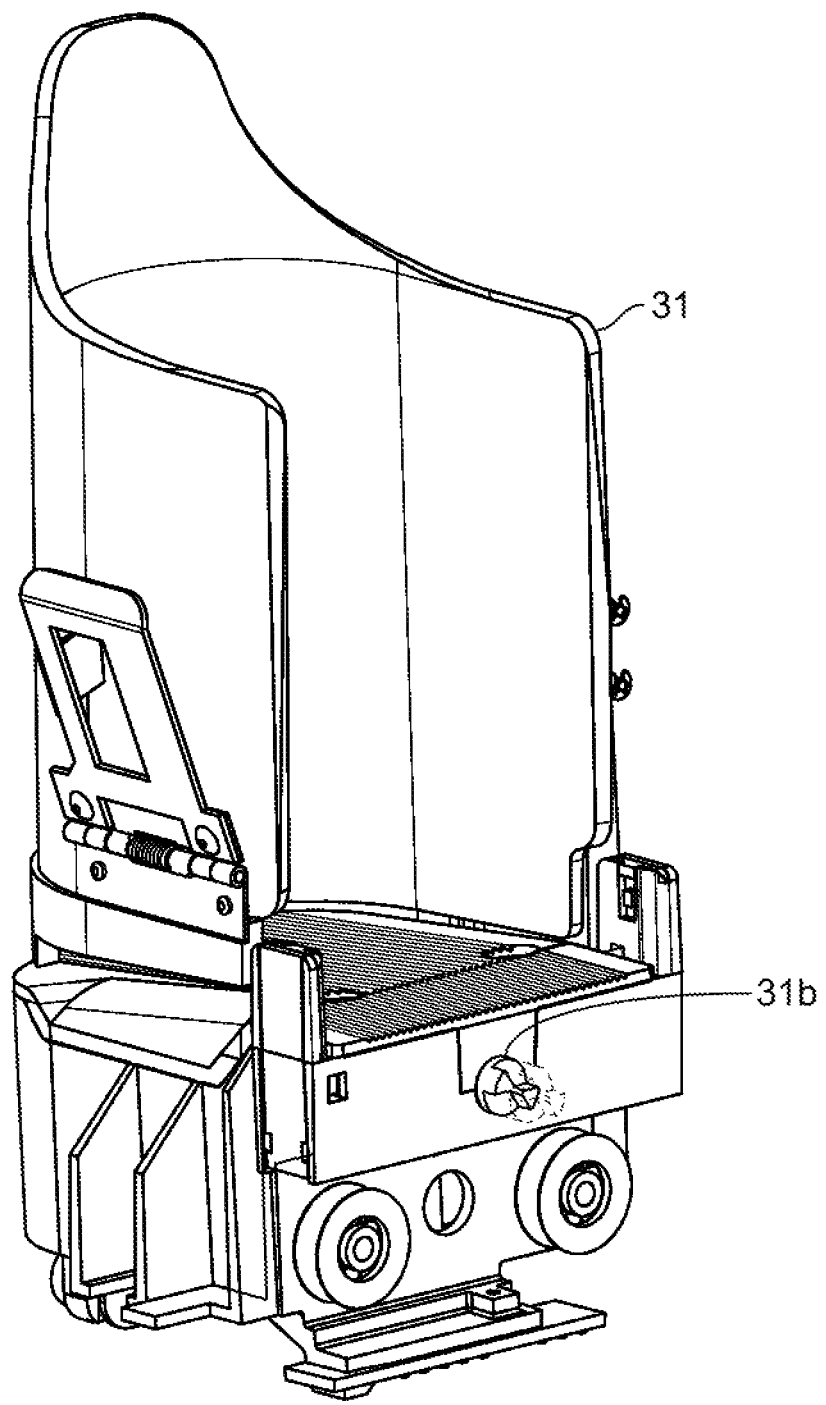
FIG. 20 is a view of a rear side of the elevator cup of the vending machine.
Figure 22A:
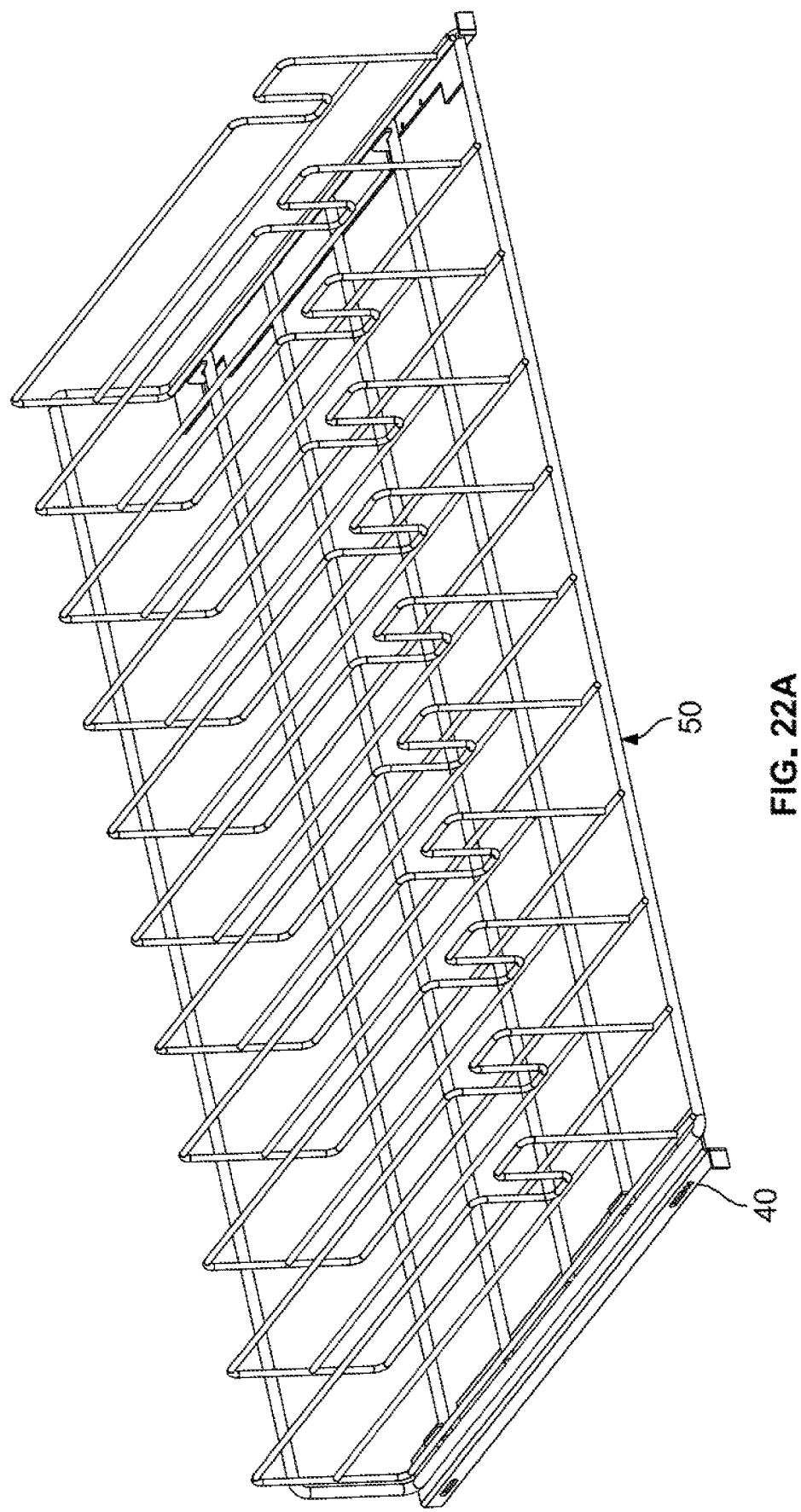
FIG. 22A is a front upper perspective view of a rack mounted on mounting rails of the vending machine.
Figure 22B:
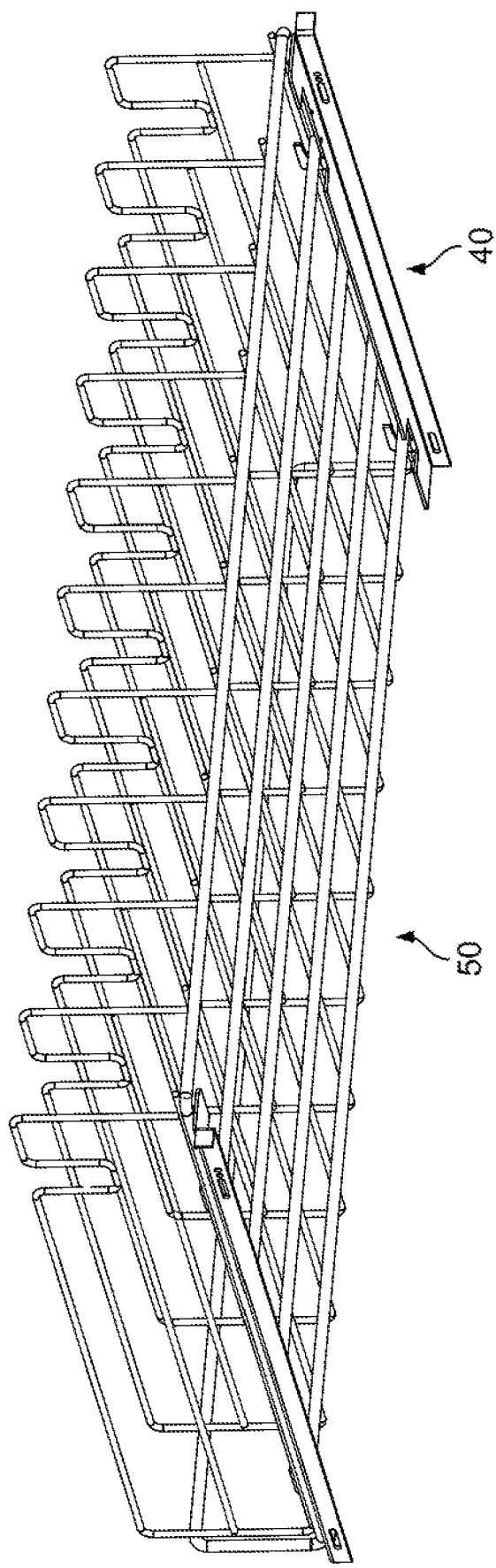
FIG. 22B is a front lower perspective view of a rack mounted on mounting rails of the vending machine.
Figure 23:
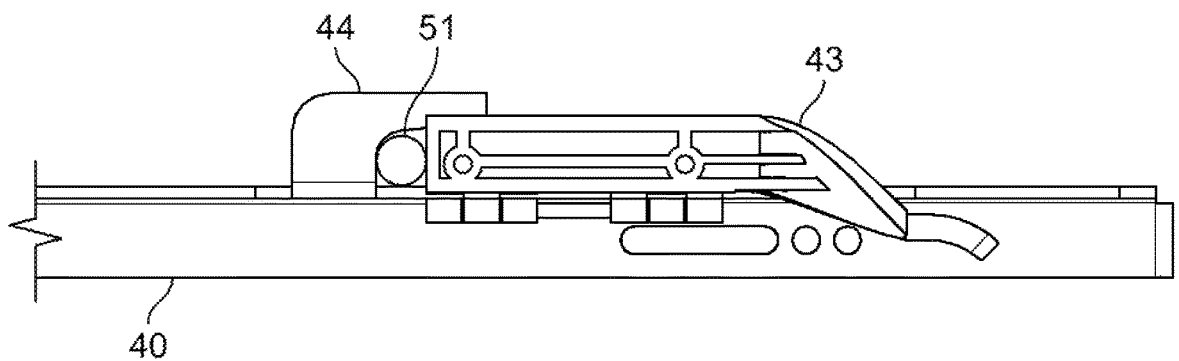
FIG. 23 is a cross-sectional view showing a rack in an installed state on the mounting rails of the vending machine.
Figure 24:
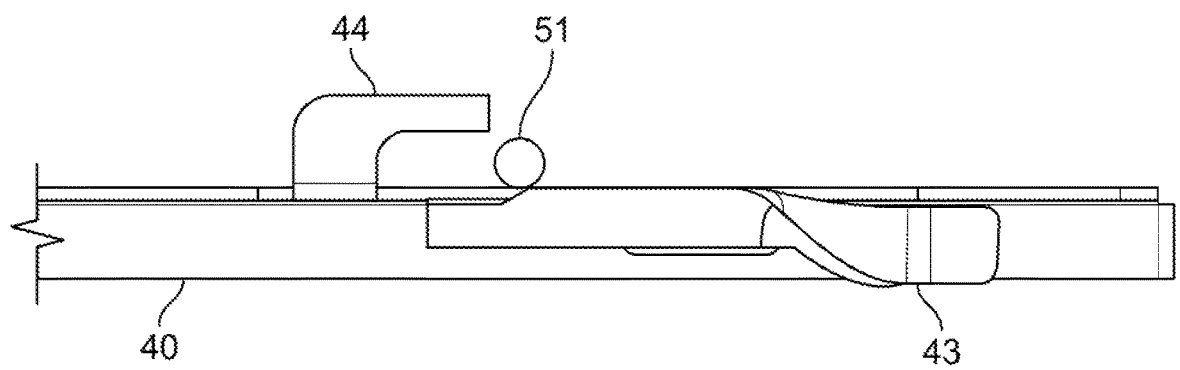
FIG. 24 is a cross-sectional view showing a rack in the process of being installed or removed on the mounting rails of the vending machine.

Next, the delivery of product P from a tray 60 to the elevator cup 31 will be briefly explained, in order to describe the feature of the vending machine 1 being adaptable for vending products P of different sizes. As previously described, each tray 60 includes a screw mechanism 61, and a rear wall 63, which moves on the screw mechanism 61. A forward-facing portion of the screw mechanism 61, visible from the front face of the tray 60, includes a female screw part 61*a*. Additionally, the elevator cup 31 includes a retractable male screwdriver part 31*b*. See FIG. 20. When the elevator cup 31 is moved to the position of a particular tray 60, the retractable male screwdriver part 31*b* on the elevator cup 31 aligns with the female screw part 61*a* on the tray 60. The male screwdriver part 31*b* extends from its retracted position using a motor, so as to engage the female screw part 61*a*. The male screwdriver part 31*b* then rotates a predetermined number of times using another motor, causing the rear wall 63 to move forward by rotation of the female screw part 61*a* and the screw mechanism 61. The extension/retraction and the rotation of the male screwdriver part 31*b* are controlled by the controller C. This forces a product P forward, and forces the gate portions 70 to open against the spring bias force of the gate portions 70. The product P then falls into the elevator cup 31, which confirms the presence of the product P with a product sensor 31*a*, such as an optical sensor or a weight sensor.

However, various types of vended products P have different sizes. For example, energy drink products often have a diameter of approximately 2.1 inches, canned soda products often have a diameter of approximately 2.6 inches, and sports drinks products often have a diameter of 2.9 inches. Thus, the same number of rotations of the male screwdriver part 31*b* cannot be used for all products.

In the disclosed vending machine 1, each position in the product area 3 may be set to a particular size of vended product P. As an example, the trays 60 may be labeled with a letter and number combination, such as positions A1-A10 on a first rack 50, B1-B10 on a second rack 50, etc. The size of the vended product P may be set via the keypad K and the display screen S in the transaction area 4. This data is then stored in the controller C, which instructs the elevator cup 31 to turn the male screwdriver part 31*b* the appropriate number of times, depending on the position of the vended product P. The controller C may allow the user to select specific product P size values in terms of diameter. Alternatively, the controller C may allow the user to select between several pre-programmed options corresponding to the most common sizes of products. For example, the user could select "Small" as corresponding to a 2.1 inch diameter product, "Medium" as corresponding to a 2.6 inch diameter product, and "Large" as corresponding to a 2.9 inch diameter product.

Additionally, although it is possible for each position in the product area 3 to be individually set, this may be cumbersome for a user. Therefore, the controller C may also allow the user to set the product size for an entire rack(s) 50 (for example, positions A1-A10) at one time. The controller C may also allow the user to set the product size for an entire column(s) (for example, positions A1, B1, C1, etc.) at one time. The controller C may also allow the user to set the product size for a portion of a rack(s) 50 (for example, positions A1-A5) at one time, without setting the product size for a remainder of a rack(s) 50 (for example, positions A6-A10). The controller C may also allow the user to set the product size for every position in the product area 3 at one time.

Next, price setting will be discussed. Like conventional vending machines, the disclosed vending machine 1 is configured such the products in various positions may have different prices. For example, canned soda may cost $1, while a large bottle of sports drink may cost $2. However, it can be cumbersome to program the price of each position individually.

Therefore, the controller C may also allow the user to set the price for an entire rack(s) 50 (for example, positions A1-A10) at one time. The controller C may also allow the user to set the price for an entire column(s) (for example, positions A1, B1, C1, etc.) at one time. The controller C may also allow the user to set the price for a portion of a rack(s) 50 (for example, positions A1-A5) at one time, without setting the price for a remainder of a rack(s) 50 (for example, positions A6-A10). The controller C may also allow the user to set the price for every position in the product area 3 at one time.

Next, the refrigeration system of the vending machine 1 will be discussed. As discussed above, the refrigeration equipment includes conventional hardware, such as a thermostat, compressor, condenser coil, evaporator coils, and liquid or gaseous refrigerant. The refrigeration equipment may be disposed at any location in the vending machine 1, but it is desirable to provide the refrigeration equipment at a location which is less visible to customers, such as the lower portion of the cabinet 2.

In conventional vending machines, the refrigeration equipment may be disposed in various portions of the machine. Accordingly, in the event of maintenance or repair of the refrigeration equipment, a skilled refrigeration technician is required to visit the machine, and the machine must be taken out of service for an extended period of time.

However, in the disclosed vending machine, multiple key components of the refrigeration system are disposed in a single cassette RC. See FIG. 11. For example, all of the compressor, compressor fan motor, and evaporator fan motor may be disposed within the refrigeration cassette RC. The compressor, compressor fan and evaporator fan may be surrounded by a two-piece foam insulation within the cassette RC, to improve thermal efficiency and to immobilize the components of the refrigeration system. The refrigeration cassette RC is electrically connected to the remainder of the vending machine 1 by a single multi-pin connector.

Accordingly, a problematic refrigeration cassette RC can be quickly and easily removed, and replaced with a known functioning refrigeration cassette RC. Thus, it is not necessary to send a skilled refrigeration technician to repair a fault. Rather, an unskilled person can remove the cassette RC and bring the cassette RC to a centralized service center, where the cassette RC would be serviced before being re-installed. This permits a reduction in service costs, and also allows for the vending machine to be taken out of service for only a brief period.

Next, legs and an underside of the vending machine 1 will be discussed. As discussed above, there is a concern about theft by "rocking" a vending machine forward and rearward. In order to mitigate this issue, the vending machine 1 may be provided with anti-theft legs or an anti-theft underside mechanism. The anti-theft legs and anti-theft underside mechanisms prohibit a rapid rocking forward, after the machine has been rocked backwards.

Figure 13:
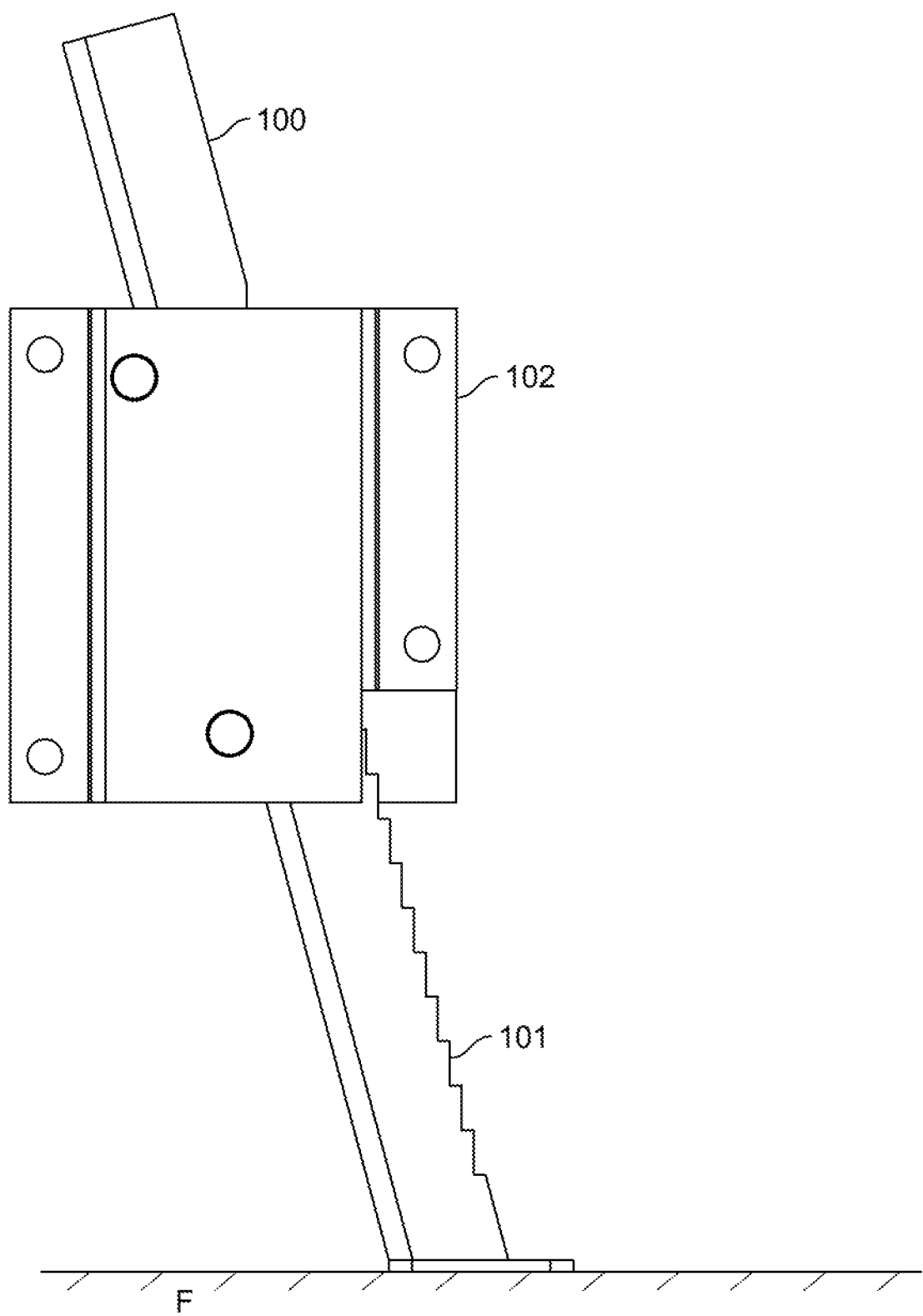
FIG. 13 is side view of anti-theft legs of the vending machine.
Figure 14:
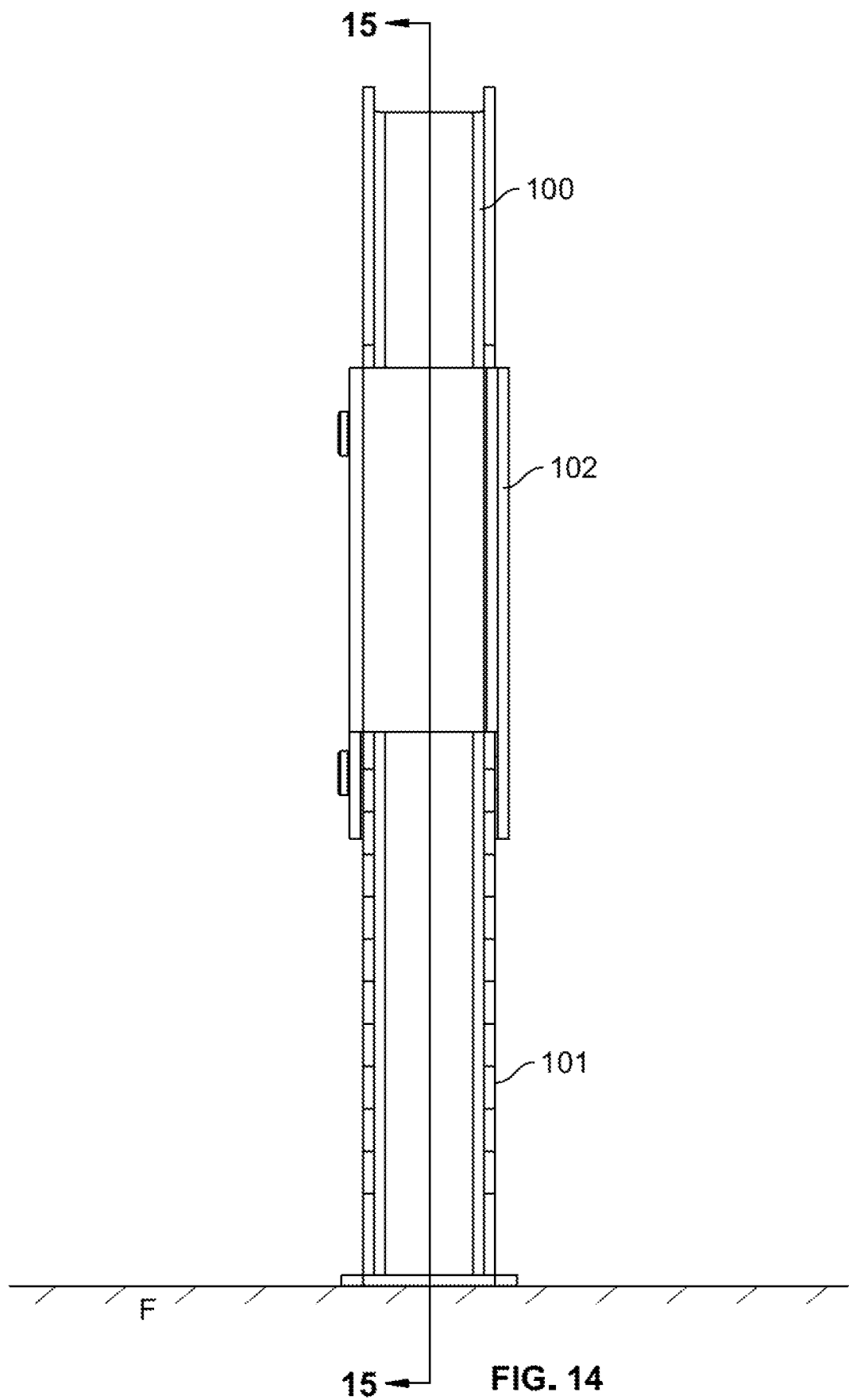
FIG. 14 is a front view of anti-theft legs of the vending machine.
Figure 15:
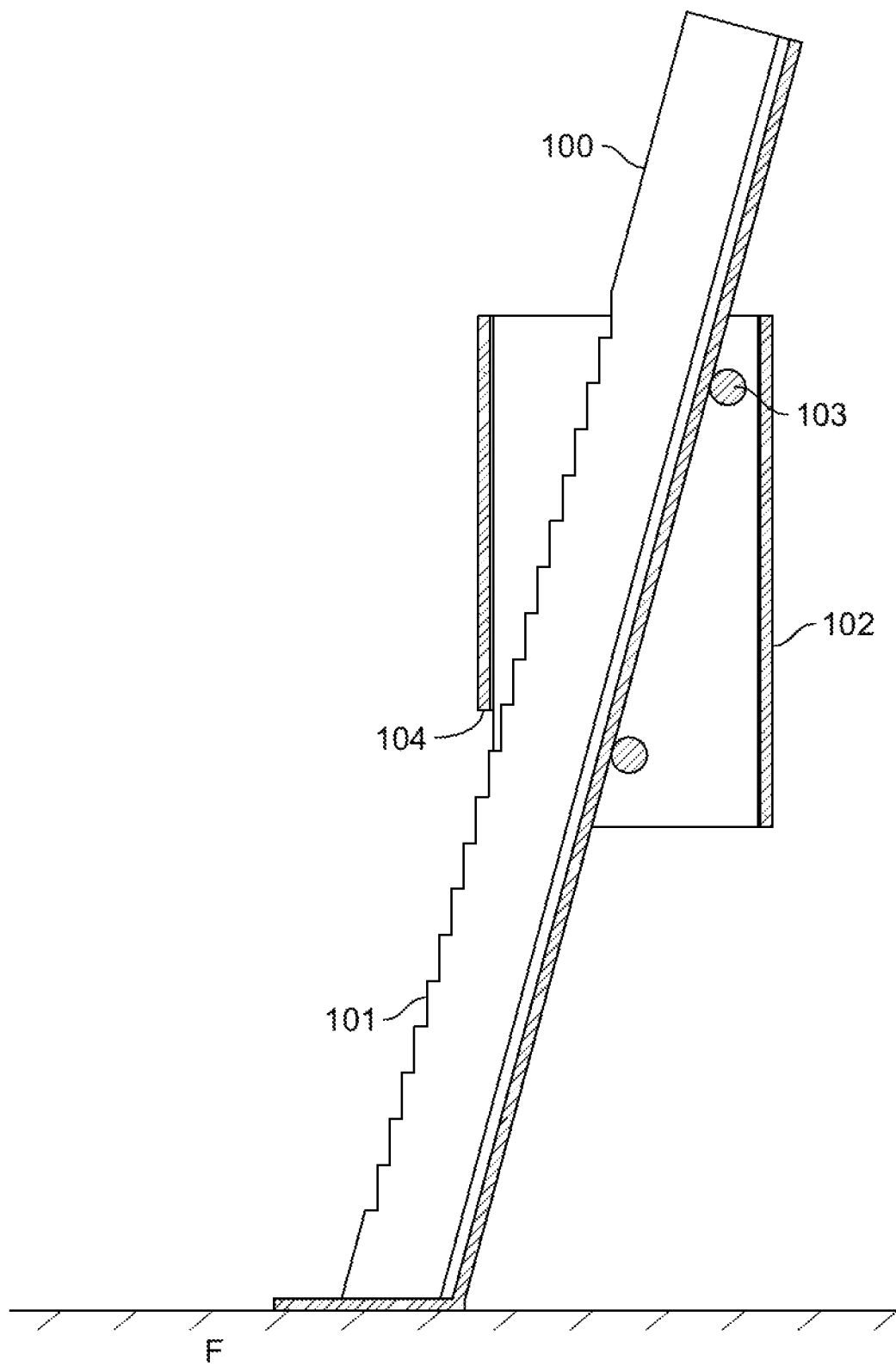
FIG. 15 is a cross-sectional view of the anti-theft legs of the vending machine taken along the line 15-15 of FIG. 14.

In particular, as shown in FIGS. 13-15, an anti-theft leg 100 can have a toothed profile. The anti-theft leg 100 extends diagonally relative to an underside of the machine 1 and includes a series of teeth 101 on one side thereof. The anti-theft leg 100 passes through a bracket 102 on guides 103, and the bracket 102 is mounted to the cabinet 2 of the machine 1. The anti-theft leg 100 may extend on its own by gravity, and thus will touch the floor F during normal operation. When the front of the machine 1 is tilted, for example, the distance from the underside of the front of the cabinet 2 to the floor F will increase relative to normal operation, and all of the weight of the machine 1 will be borne by the rear legs. At this time, the anti-theft leg 100 disposed at the front of the machine 1 extends by gravity so as touch the floor F. Then, when the "rocking" force is removed such that some of the weight is borne by the front of the machine 1, one of the teeth 101 of the anti-theft leg 100 will engage with an engaging edge 104 of the bracket. As such, once the anti-theft leg 100 is extended, the anti-theft leg 100 is locked in the extended position. In this case, a service person would be required to reset the vending machine using appropriate tools.

One or more anti-theft legs can be provided to the front of the cabinet 2. Alternatively, one or more anti-theft legs 100 can be provided to the rear of the cabinet 2. As another alternative, anti-theft legs 100 may be provided to both the front and rear of the cabinet 2. Further, the anti-theft legs 100 may be the only legs on the vending machine, and thus may be load-bearing during normal operation. Alternatively, the anti-theft legs 100 may be provided in addition to normal legs which are load-bearing during normal operations.

Figure 16:
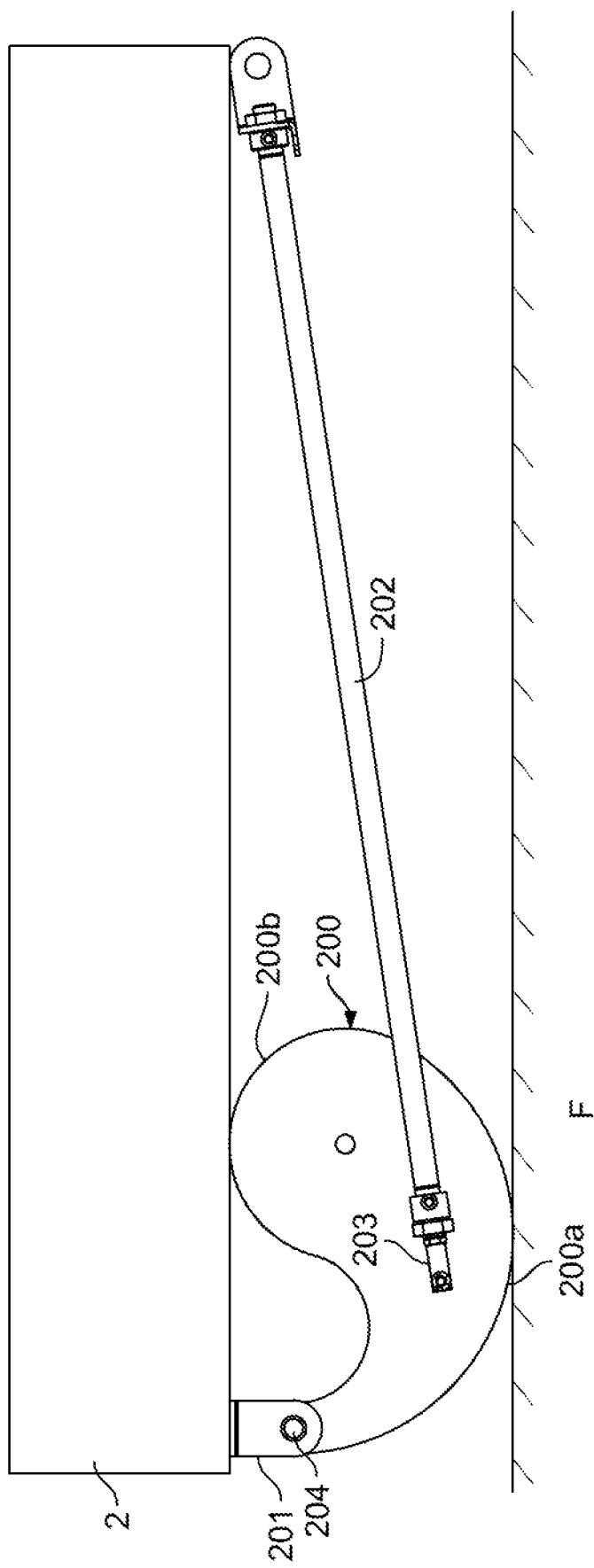
FIG. 16 is a side view of an anti-theft cam mechanism of the vending machine.

Additionally or alternatively, the vending machine 1 may have an anti-theft underside mechanism. One embodiment of this is an anti-theft cam mechanism, which is illustrated in FIG. 16. The cam mechanism includes an eccentric cam 200 pivotably connected to bracket 201 at a rotational center 204 of the cam 200. The bracket 201 is fixed to a front portion of the underside of the cabinet 2. A substantially central portion of the eccentric cam 200 is pivotably connected via a bracket 203 to a cylinder 202 which may be an air cylinder or hydraulic cylinder. A side of the cylinder 202 opposite the eccentric cam 200 is pivotably connected to the rear underside of the cabinet 2.

During normal operation, a first edge portion 200a of the cam 200 will contact the floor. When the front of the machine 1 is tilted upwards, the cylinder 202 will expand, causing the cam 200 to rotate relative to the cabinet 2 while touching the floor F, such that a second edge portion 200b is contacting the floor F. When the machine 1 is released, the front of the cabinet 2 will fall towards the floor F. However, the cylinder 202 compresses slowly, and the first edge portion 200a of the cam 202 eventually touches the floor. Since the cylinder 202 resists the downward movement of the cabinet 2, the front of the vending machine 1 will not fall suddenly to the floor, but rather will gradually fall from its tilted position to its normal position. One or more of these cam mechanisms can be provided, for example, on the left and right sides of the machines. Further, alternatively or additionally to the above-described configuration, a cam mechanism can provided in the reverse position as discussed above, with the cam 200 near the rear of the machine.

Figure 17:
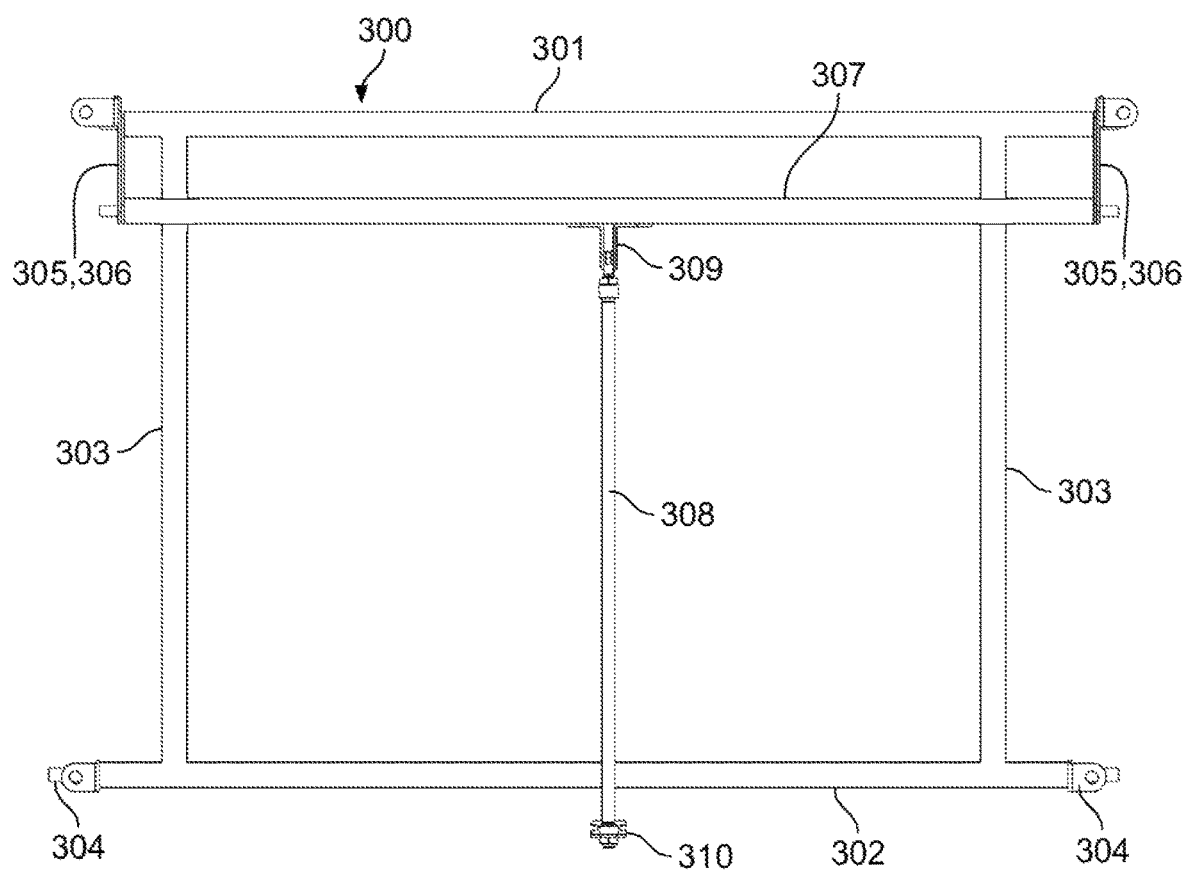
FIG. 17 is a top view of an anti-theft frame mechanism of the vending machine, with the cabinet omitted.
Figure 18:
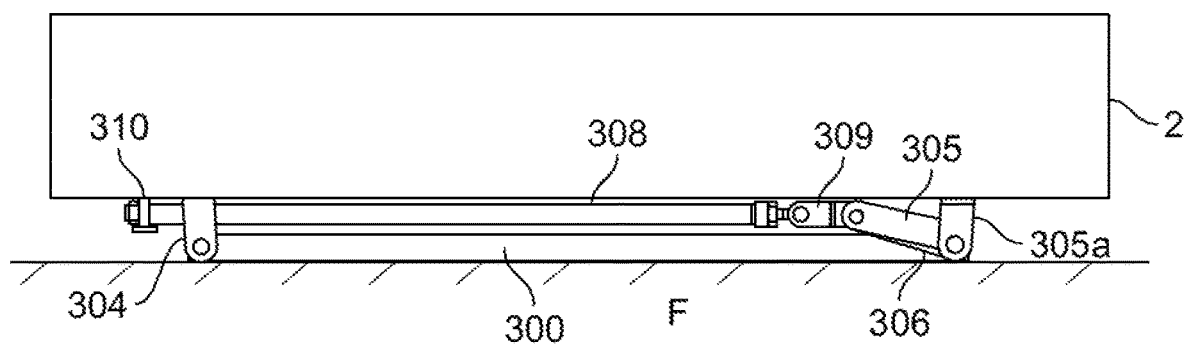
FIG. 18 is a side view of an anti-theft frame mechanism of the vending machine.

Next, another embodiment of an anti-theft underside mechanism will provided. This second embodiment of the anti-theft underside mechanism includes a hinged frame 300 having a front bar 301 and a rear bar 302 as transverse bars, joined by two side bars 303 as longitudinal bars. This is illustrated in FIGS. 17 and 18. On each of the left and right sides, the rear of the frame 300 is pivotably connected to the underside of the cabinet 2 via a bracket 304. On each of the left and right sides, the front of the frame 300 is connected to the underside of the cabinet 2 via a first link 305 and a second link 306. The first link 305 is pivotably connected to the underside of the front of the cabinet 2 via a bracket 305a and is pivotably connected to the second link 306. The second link 306 is pivotably connected to the first link 305 and the front bar 301 of the frame 300. At the point where the first link 305 and the second link 306 are pivotably connected to each other, a crossbar 307 spans from the left side to the right side. A cylinder 308, which may be an air cylinder or a hydraulic cylinder, is pivotably connected to the crossbar 307 via a bracket 309. On an end of the cylinder 308 opposite to the crossbar 307, the cylinder 308 is pivotably connected to a bracket 310 which is fixed to a central rear underside of the cabinet 2.

During normal operation, the first link 305 and the second link 306 will be substantially folded, and the front of the frame 300 will contact the floor F. When the front of the machine 1 is tilted upwards, the cylinder 308 will expand, causing the first link 305 and second link 306 to straighten relative to each other, such that the front of the frame 300 will continue to contact the floor F. When the machine 1 is released, the front of the cabinet 2 will fall towards the ground. However, the cylinder 308 compresses slowly, causing the first link 305 and second link 306 to return to their substantially folded position slowly. Since the cylinder 308 resists the downward movement of the cabinet 2, the front of the vending machine 1 will not fall suddenly to the floor F, but rather will gradually fall from its tilted position to its normal position. Alternatively or additionally, this mechanism can provided in the reverse position as discussed above, with the first link 305 and second link 306 near the rear of the machine.

Next, the transaction door 7 is discussed. In the conventional clear door vending machine, the transaction area includes a transaction door having a display screen, a selection input pad, currency input hardware, and a delivery bin, for example. Conventionally, the transaction door is hinged about an outermost edge of the vending machine.

Figure 2:
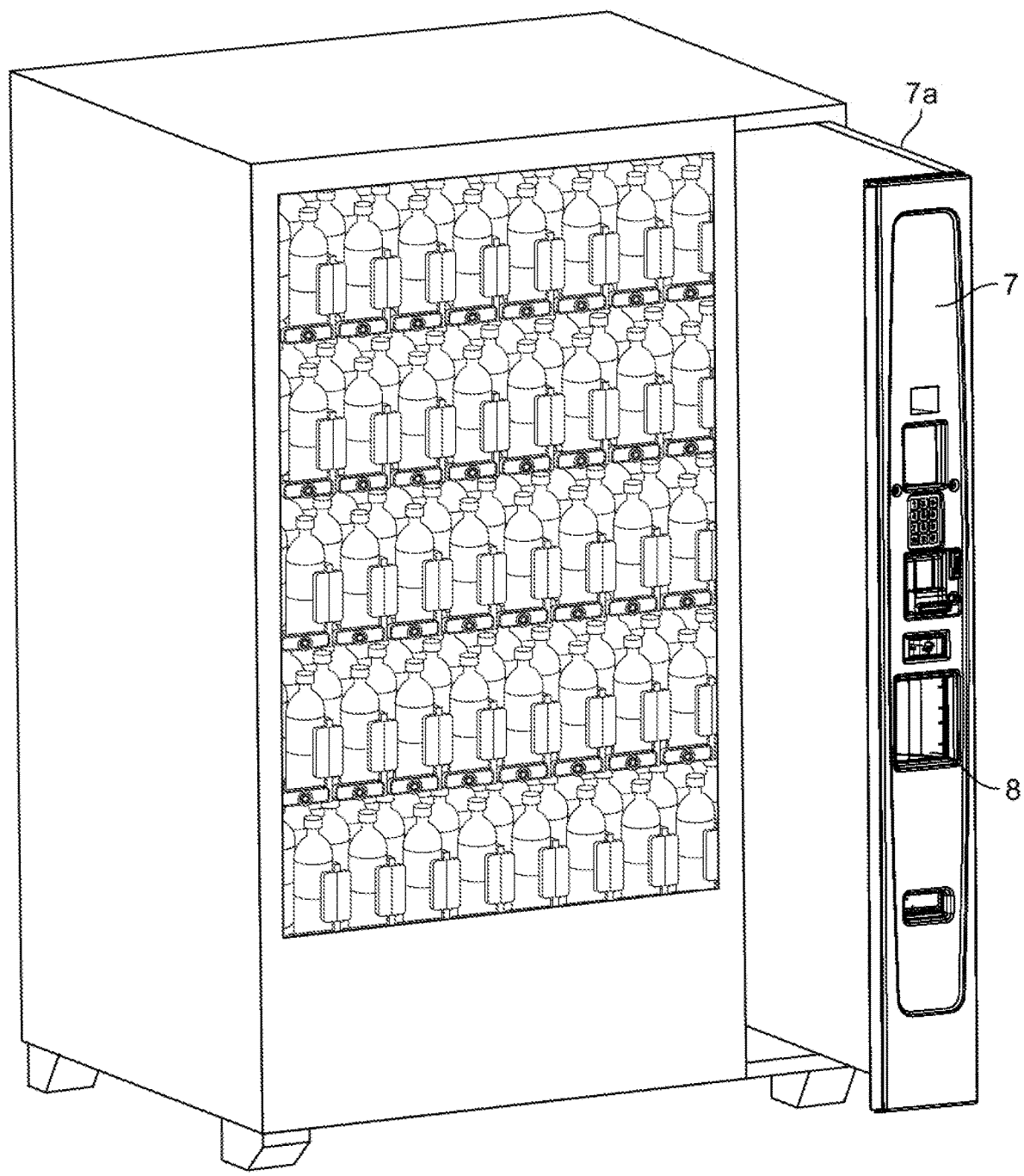
FIG. 2 is a front perspective view of the vending machine in a state in which the transaction door is opened.

However, in the disclosed vending machine 1, the transaction door 7 pulls out, rather than swinging. See FIG. 2. For example, the transaction door 7 may travel on a track 7a. The track 7a must be strong enough to support the weight of the transaction door 7, and all components fixed thereto. Since the transaction door 7 pulls out, rather than pivots on a hinge, the components fixed to the transaction door 7 may be more easily accessed for service and repair.

As discussed above, the vending machine 1 includes a controller C. This controller C may include a CPU having a processor and a memory, and is electrically connected to various modules, such as the modules which control the above-referenced XY mechanism 30, male screwdriver part 31b of the elevator cup 31, product sensor 31a in the elevator cup 31, product sensor 20a in the delivery bin 20, lights and speakers, accelerometer 80b, guillotine door motor 10b and delivery bin door motor 20b, guillotine door lock 10a and delivery bin door lock 20a, currency input hardware CI, selection input pad K, display screen S, and the refrigeration system. See FIG. 12. In the event that any of these modules need software or firmware updates, the software or firmware may be loaded into a data entry means (such as a USB port) of the controller C. The controller C may then update the other modules as needed.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The invention claimed is:

1. A vending machine, comprising:
a product area;
a transaction area including a delivery bin and a delivery bin door;
an interior wall dividing the product area and the transaction area, the interior wall including a guillotine door;
a controller;
a guillotine door lock; and
a delivery bin door lock;
wherein the delivery bin door opens and closes to allow or prevent communication between the delivery bin and an outside of the vending machine,
wherein the guillotine door opens and closes to allow or prevent communication between the product area and the delivery bin,
wherein the controller is electrically connected to the guillotine door lock and the delivery bin door lock, and
wherein the controller controls the guillotine door lock and the delivery bin door lock such that both the guillotine door lock and the delivery bin door lock are not both unlocked at the same time.

2. The vending machine according to claim 1, further comprising:
an XY mechanism in the product area, the XY mechanism including an elevator cup configured to receive a vended product and deliver the vended product to the delivery bin via the guillotine door;
a product sensor in the XY mechanism; and
a product sensor in the delivery bin;
wherein the product sensor in the XY mechanism and the product sensor in the delivery are both electrically connected to the controller,
wherein, when the vended product is detected by the product sensor in the XY mechanism, the controller unlocks the guillotine door lock and locks the delivery bin door lock, and
wherein, when the vended product is detected by the product sensor in the delivery bin, the controller locks the guillotine door lock and unlocks the delivery bin door lock.

3. The vending machine according to claim 2, wherein when the vended product is not detected by both the product sensor in the XY mechanism and the product sensor in the delivery bin, the controller locks both the guillotine door lock and the delivery bin door lock.

4. The vending machine according to claim 2, wherein when the vended product is not detected by both the product sensor in the XY mechanism and the product sensor in the delivery bin, the controller locks only the delivery bin door lock.

5. A vending machine, comprising:
a product area having a substantially transparent front panel; and
a level sensor disposed on a lower horizontal surface of the product area,
wherein the level sensor is disposed at a position viewable through the substantially transparent front panel, and
wherein the level sensor is a bubble level.

6. A vending machine, comprising:
a level sensor disposed on a horizontal surface of the vending machine;
a controller; and
a display screen,
wherein the level sensor comprises one or more accelerometers,
wherein the level sensor outputs incline data to the controller, and
wherein the controller outputs incline data from the level sensor to the display in a textual or graphical format.

7. The vending machine according to claim 6,
wherein the display screen displays a warning when the incline data exceeds a predetermined incline.

8. The vending machine according to claim 7, wherein the predetermined incline is 3°.

9. The vending machine according to claim 6,
wherein the vending machine comprises at least one alarm selected from the group consisting of a sound alarm and a light alarm, and
wherein the controller actuates the at least one alarm when the incline data exceeds a predetermined incline.

10. The vending machine according to claim 9, wherein the predetermined incline is 3°.

11. The vending machine according to claim 6, wherein, when the incline data exceeds a predetermined incline, the controller suspends vending operation of the vending machine for a predetermined time period.

12. The vending machine according to claim 11, wherein the predetermined incline is 3°.

13. A vending machine, comprising:
a product area including an XY mechanism, the XY mechanism including a motor for movement in an X-axis direction and a motor for movement in a Y-axis direction;
a transaction area;
an interior wall dividing the product area and the transaction area,
wherein the motor for movement in the Y-axis direction is disposed in the transaction area.

14. The vending machine according to claim 13, further comprising:
a plurality of trays for holding a vending product, each tray including a female screw part; and
a controller,
wherein the XY mechanism further comprises
an elevator cup configured to receive the vended product and deliver the vended product to a delivery bin;
a male screwdriver part capable of engaging with the female screw part of the tray; and
a product sensor which detects the presence or absence of the vended product in the elevator cup;
wherein the controller controls the XY mechanism to move the elevator cup to a position corresponding to a desired vended product, and then controls the male screwdriver to engage and rotate the female screw part, wherein the female screw part is configured such that rotation of the female screw part will cause the vended product to fall from one of the plurality of trays into the elevator cup, and wherein, when a product is not detected in the elevator cup by the product sensor within a predetermined time period after the controller controls the male screwdriver part to engage and rotate the female screw part, the controller then controls the XY mechanism to reciprocate in the X-axis direction multiple times.

15. The vending machine according to claim 13, wherein the Y-axis motor is provided at a lower portion of the transaction area.

16. The vending machine according to claim 13, wherein the Y-axis motor is provided at an upper portion of the transaction area.

17. The vending machine according to claim 13,
wherein the Y-axis motor in the transaction area is covered by a housing.

18. The vending machine according to claim 13,
wherein the motor for movement in the Y-axis direction is a rotary motor having an output shaft, and
wherein the output shaft passes through a hole formed in the interior wall.

19. The vending machine according to claim 18,
wherein the output shaft is coupled to a product area shaft, such that the output shaft and the product area shaft rotate together.

20. The vending machine according to claim 19,
wherein a cog is provided on each end of the product area shaft, the cogs each driving a belt or chain, and
wherein driving of the belts or chains causes an elevator cup to move in the Y-axis direction, the elevator cup being configured to receive a product from the product area.

21. The vending machine according to claim 19,
wherein a first cog is provided on the output shaft in the product area, and a second cog is provided on the product area shaft at an end opposite of the output shaft, the first and second cogs each driving a belt or chain, and
wherein driving of the belts or chains causes an elevator cup to move in the Y-axis direction, the elevator cup being configured to receive a product from the product area.

* * * * *